United States Patent [19]

Harrell et al.

[11] 3,810,694

[45] May 14, 1974

[54] PHOTOGRAPHIC PRINTING APPARATUS

[75] Inventors: Robert E. Harrell, Manchester; Richard E. Hadley, Creve Coeur, both of Mo.

[73] Assignee: Western Litho Plate & Supply Co., St. Louis, Mo.

[22] Filed: Apr. 17, 1972

[21] Appl. No.: 244,364

Related U.S. Application Data

[63] Continuation-in-part of Ser. No. 71,162, Sept. 10, 1970, abandoned.

[52] U.S. Cl. ................ 355/18, 198/33 AB, 271/79, 355/53, 355/72, 355/85

[51] Int. Cl. ...................... G03b 27/00, G03b 27/42

[58] Field of Search ........... 355/128, 72, 53, 85, 64, 355/50, 51, 18; 271/79; 198/33 AB

[56] References Cited

UNITED STATES PATENTS

| | | | |
|---|---|---|---|
| 3,635,559 | 1/1972 | Harrell | 355/85 |
| 3,549,145 | 12/1970 | Trautmann | 271/79 |
| 3,416,790 | 12/1968 | Davis | 271/80 X |
| 3,218,069 | 11/1965 | Halberschmidt | 271/74 X |
| R26,771 | 1/1970 | Schwardt | 355/66 X |
| 2,206,396 | 7/1940 | Glass | 355/19 |
| 2,468,935 | 5/1949 | Langdon | 355/66 |
| 3,689,150 | 9/1972 | Nothmann | 271/79 X |
| 3,479,121 | 11/1969 | Burgess | 355/85 |
| 2,914,996 | 12/1959 | Whitham | 355/53 X |

*Primary Examiner*—Joseph F. Peters, Jr.
*Assistant Examiner*—Richard A. Wintercorn
*Attorney, Agent, or Firm*—Koenig, Senniger, Powers and Leavitt

[57] ABSTRACT

A photographic printing apparatus, particularly for exposing lithographic plates to light through films, having a table on which a film may be assembled with a plate in registration therewith, the plate/film assembly then being fed to and gripped by a conveyor, which conveys it to a position within a vacuum frame unit at an exposure station, after which the vacuum frame unit is closed and evacuated for pressurizing the assembly. The plate is then exposed, the vacuum unit is opened, and the conveyor actuated to feed the exposed plate with the film thereon to an output station, at which the grip is released, and a vacuum lift picks up the film from the plate and drops it into a chute for return to the entrance end of the apparatus, the plate being fed forward out of the apparatus by a plate feed roll arrangement.

Also, adaptations of this apparatus for contact exposure of lithographic plates to light through film from a roll, and for exposure of lithographic plates via projection of enlarged images from microfilm or other film.

35 Claims, 33 Drawing Figures

Robert E. Harrell,
Richard E. Hadley,
Inventors.
Koenig, Senniger,
Powers and Leavitt
Attorneys.

PATENTED MAY 14 1974 3,810,694

SHEET 03 OF 17

PATENTED MAY 14 1974

3,810,694

PHOTOGRAPHIC PRINTING APPARATUS

CROSS-REFERENCE TO RELATED APPLICATION

This application is a continuation-in-part of our copending application Ser. No. 71,162, filed Sept. 10, 1970, now abandoned entitled Photographic Printing Apparatus (now abandoned).

BACKGROUND OF THE INVENTION

This invention relates to photographic printing apparatus, and more particularly to apparatus for automatically carrying photosensitive plates, and especially lithographic plates, through an exposure operation.

The invention involves improvements on the photographic printing apparatus shown in the coassigned copending application of Robert E. Harrell and Edward H. Parker, Ser. No. 872,867, filed Oct. 31, 1969 now U.S. Pat. No. 3,635,559, issued Jan. 18, 1972.

SUMMARY OF THE INVENTION

Among the several objects of the invention may be noted the provision of an improved photographic printing apparatus, particularly for exposing lithographic plates, of the type shown in said copending application, adapted automatically to handle the plates subsequent to the exposure thereof; the provision of such apparatus having such means for automatically delivering the exposed plates to a plate processing machine for developing the images on the plates; the provision of such apparatus adapted to facilitate the registration of films (e.g., negatives or positives) with the plates and the introduction thereof into the apparatus; the provision of such apparatus adapted automatically to handle the films (e.g., negatives or positives) after the exposure of the plates; the provision of such apparatus adapted to handle the exposure of either one or two single-size plates or a double-size plate; and the provision of such apparatus adapted to handle roll film, as distinguished from individual films (negatives or positives); and the provision of such apparatus adapted for exposure of plates via projection of enlarged images from microfilm or other film.

In general, apparatus of this invention comprises a conveyor having plate gripping means spaced at intervals along its length each adapted releasably to grip a plate for movement of the plate by the conveyor in forward direction along a predetermined path. Means is provided for intermittently operating the conveyor to index each plate gripping means from a first station for application of a plate thereto to a second station along said path for bringing the gripped plate to an exposure position and thence to a third station farther along said path for discharge of the plate. A light source is provided for exposing the plate in exposure position to light through a film after the plate gripping means has been indexed to the second station. Means is provided at the third station for releasing the plate gripping means. Means is also provided at the third station operable upon release of the plate gripping means for feeding the released plate out of the apparatus. Other objects and features will be in part apparent and in part pointed out hereinafter.

BRIEF DESCRIPTION OF THE DRAWINGS

Corresponding reference characters indicate corresponding parts throughout the several views of the drawings.

DESCRIPTION OF THE PREFERRED EMBODIMENT

Figure 1:
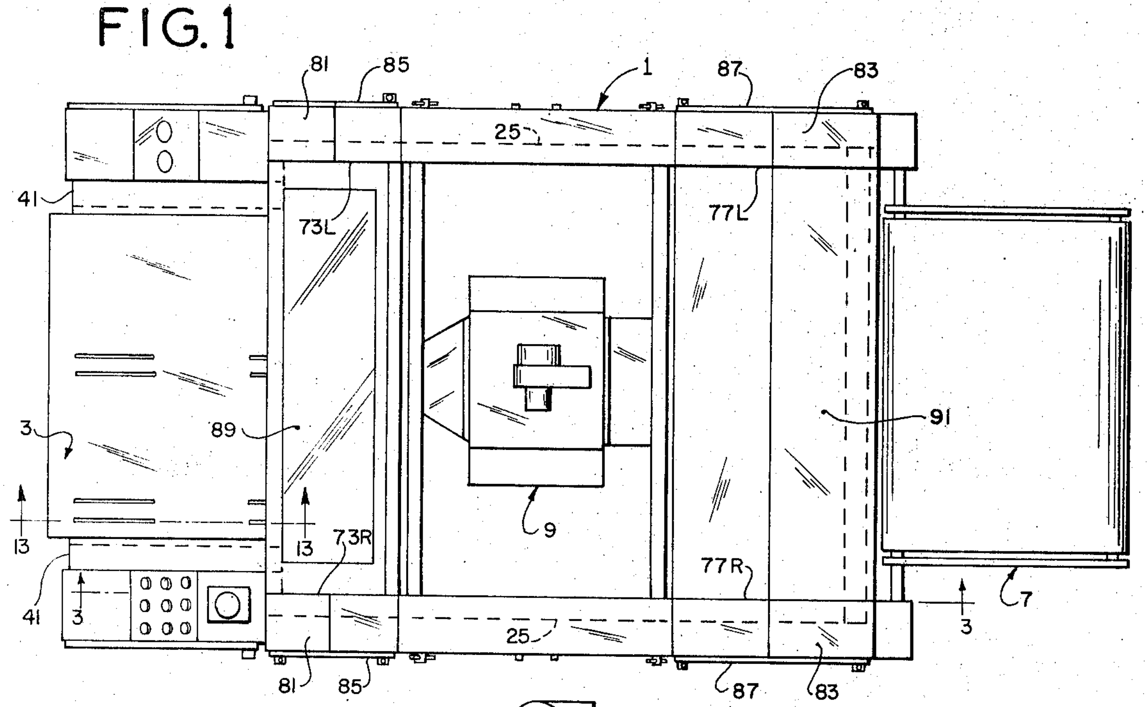
FIG. 1 is a plan of a lithographic plate exposure apparatus of this invention.
Figure 2:
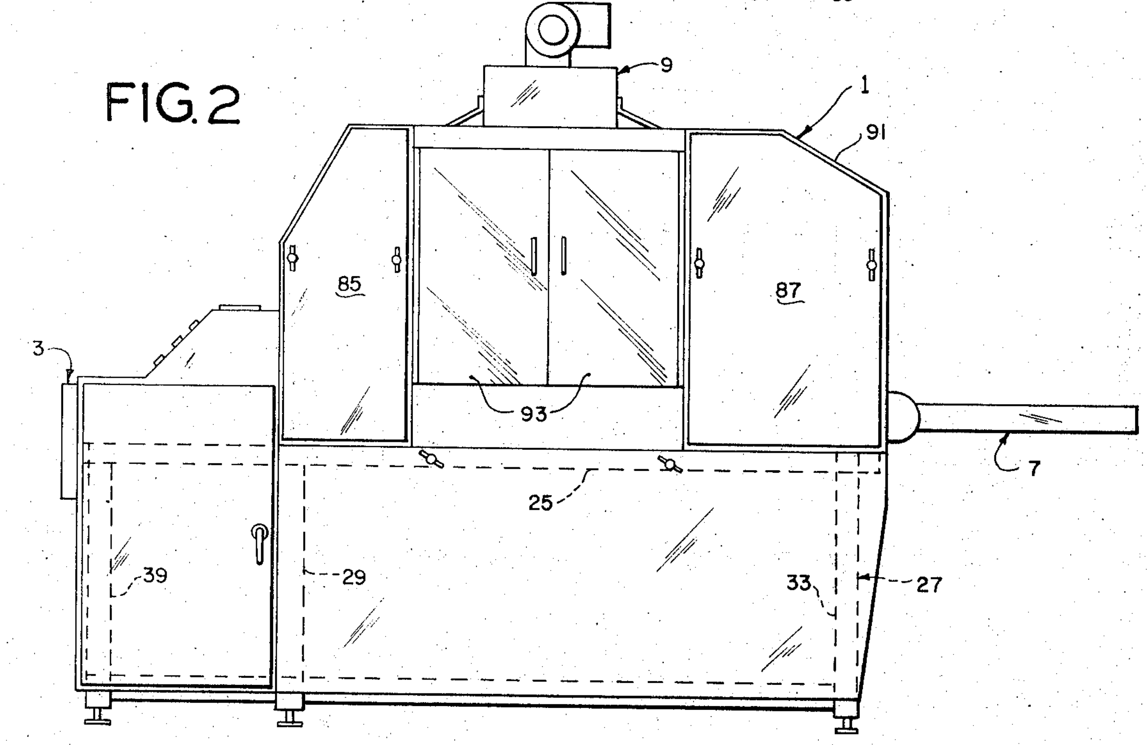
FIG. 2 is a right side elevation of the apparatus.

Referring to the drawings, a photographic printing apparatus made in accordance with this invention is shown to comprise a housing generally designated 1 with a work registration and feed table means 3 at one end of the housing constituting its input or entrance end, a main conveyor generally designated 5 within the housing (see FIG. 3) for conveying a plate P with a film F (e.g., a negative) thereon through the housing, and a discharge conveyor 7 at the other end of the housing constituting its discharge or exit end. The main conveyor 5 is an endless conveyor carrying a plurality of sets of clamps, each set being designated A (see FIGS. 3 and 6). These sets are spaced at equal intervals along the length of the conveyor, and each set comprises means for gripping a plate P and a film F. The conveyor is intermittently movable, as will appear, to index each set A forward along a predetermined horizontal path from a first station I in the housing 1 adjacent its input end, to a second station E along said path within the housing, and thence to a third station D further along said path in the housing adjacent its discharge end. As will appear, a plate P with a film F thereon (the "work") is delivered to the set of clamps or gripping means C at the first or input station I and gripped thereby. The set A is then indexed to station E, dragging the gripped plate and film to an exposure position for exposure of the plate to light via a light source 9 mounted at the top of housing 1. The set A is then indexed to station D, dragging the exposed plate with the film thereon to a position for removal of the film from the plate, followed by indexing of the conveyor to move the set A to a clearance position indicated at 0 in FIG. 11 and forward feed of the plate out of the discharge end of housing 1 to the discharge conveyor 7. The apparatus is particularly useful for exposing aluminum lithographic plates having a light-sensitive coating on one surface thereof such as are widely used, for example, in newspaper printing, but may be used for exposing photographic plates other than lithographic plates. Light from the light source 9 is transmitted to the plate through the film. Exposure is via a light-transmitting vacuum frame means 11 in the housing 1 for pressing the plate-film assembly dragged into exposure position by the set of clamps A when the latter has been indexed to station E.

The main conveyor 5 is an endless chain conveyor comprising a pair of parallel endless chains each designated 13 trained around sprockets 15 on a horizontal sprocket shaft 17 adjacent the input end of the housing 1 and sprockets 19 on a horizontal sprocket shaft 21 adjacent the output end of the housing. These sprocket shafts are journalled in bearings such as indicated at 23 mounted on side rails 25 of a main frame generally designated 27. This frame includes a pair of legs 29 supporting a crossbar 31 carrying the ends of the side rails adjacent the input end of the apparatus and a pair of legs 33 supporting a crossbar 35 carrying the ends of the side rails adjacent the output end of the apparatus. Provision is made for mounting the table unit 3 at the input end of the apparatus by means of a pair of legs 39 spaced rearward of legs 29 and spaced laterally a distance less than the lateral spacing of legs 29, and a pair of rear end side rails 41 extending from the upper ends of legs 39 to bar 31.

The endless chains 13 have an upper horizontal reach **13*a* which travels forward (from left to right as viewed in FIG. 3) from sprockets 15 to sprockets 19. The chains extend around and downwardly from sprockets 19 to a set of chain tensioning sprockets 43, thence up and over sets of idler sprockets 45 and 47 in a lower return reach 13*b* back to sprockets 15. At 49 is indicated an electric motor (a gearmotor) for driving the chains 13 via a chain and sprocket drive 51. Each of the clamp sets A comprises a clamp carrier bar 53 spanning the chains attached at its ends to the chains by means of brackets such as indicated at 55. These bars 53 are spaced at equal intervals along the length of the chains. Each bar 53 carries a plurality of clamps C on its trailing side, four such clamps being shown on each bar by way of example, spaced at intervals along the length of the bar. Each clamp C comprises a fixed lower clamp member constituted by a metal strip 57 having a right-angled bent end 59 secured to the trailing side of the bar 53 with the strip 57 extending rearward from the bar at what may be regarded as the bottom of the bar. The strip has bent-up triangular side portions 61 receiving a pivot pin 63 carrying a movable upper clamp member 65. The latter is formed of a metal strip having bent-down triangular side portions 67 receiving the pivot pin 63, an angled rearward end jaw 69 for clamping a plate and film down against the rearward end portion of the lower member 57, and an oppositely angled operating finger 71 at its forward end. A torsion spring 73 biases the member 65 to swing down for clamping of a plate and film by jaw 69 down against the rearward end portion of member 57.**

Station I for the clamp carrier bars 53 is located slightly forward of the rearward end of the upper horizontal working reach **13*a* of the main conveyor 5, and station D is located slightly rearward of the forward end of the upper reach 13*a*. In this respect, the term "rearward" is used herein in reference to the input end of the upper working reach 13*a* of conveyor 5 and the term "forward" is used in reference to the exit end. Bars 53 are spaced on the chains 13 a distance corresponding to the spacing of stations I and D, and there are three such bars (and three clamp sets A) as herein illustrated. Extending upward from the side rails 25 adjacent the input (rearward) end of the housing 1 are left-hand and right-hand side plates 73L and 73R (left-hand and right-hand being considered as the apparatus is viewed looking forward from its input end toward its output end). Each of these side plates has flanges 75R and 75F extending laterally outwardly therefrom at its rearward and forward edges. Extending upward from the side rails adjacent the output (forward) end of the housing 1 are left-hand and right-hand side plates 77L and 77R, each of these having flanges 79R and 79F extending laterally outward therefrom at its rearward and forward edges. The rear flanges 75R of the rear side plates have inclined upper portions as indicated at 81 and the forward flanges of the forward side plates have inclined upper portions as indicated at 83. Removable panels 85 cover the outsides of the rear side plates; and removable panels 87 cover the outsides of the front side plates. An inclined window 89 spans the rear side plates 73L and R, the lower edge of this window being above the level of the upper reach 13*a* of conveyor 5. A top panel 91 spans the top of the forward side plates 77L and R. Doors 93** are provided between the rear and forward side plates.

Figure 7:
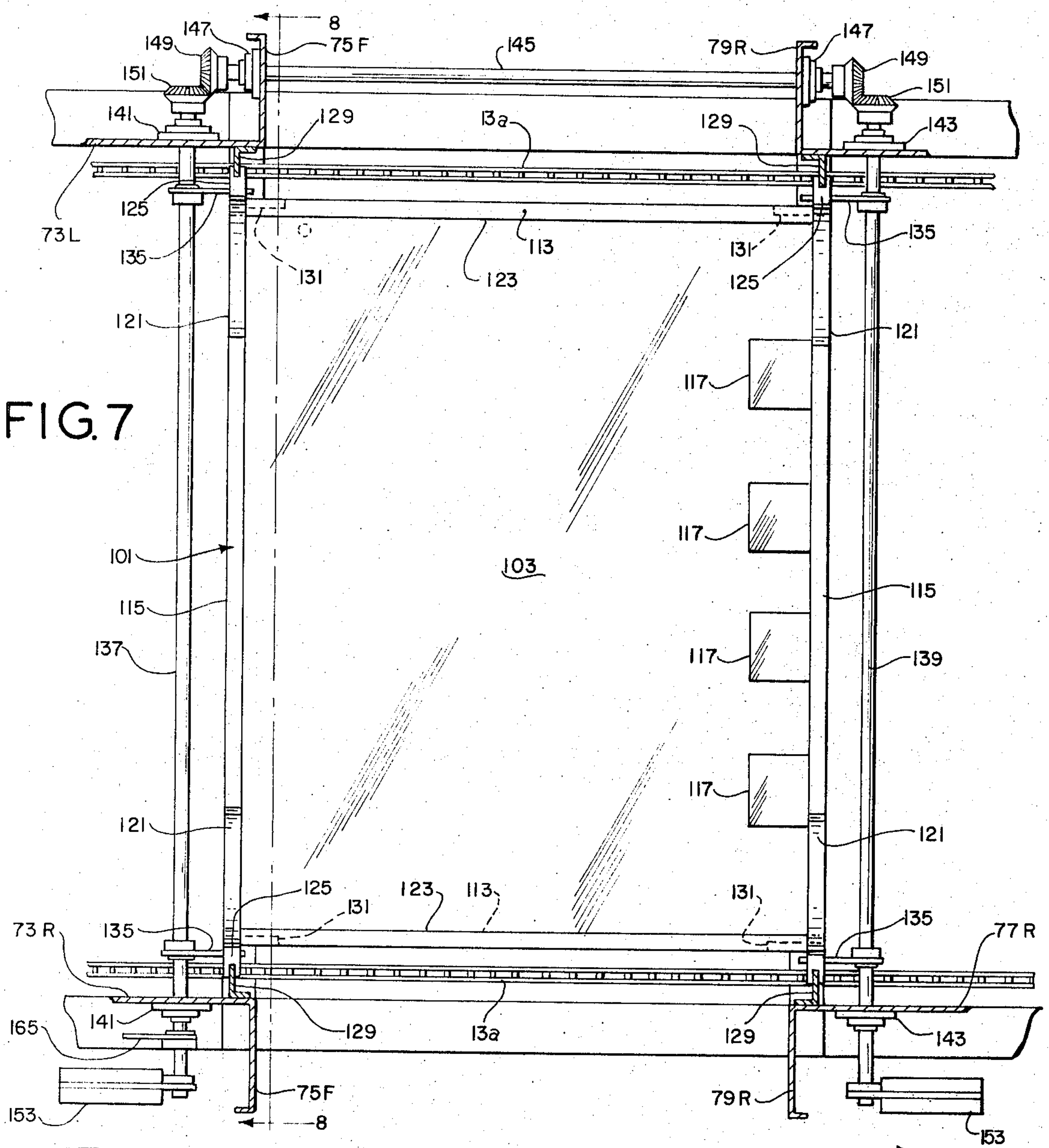
FIG. 7 is a horizontal section showing a window of the apparatus and its operating mechanism, taken generally on line 7—7 of FIGS. 3 and 8.
Figure 8:
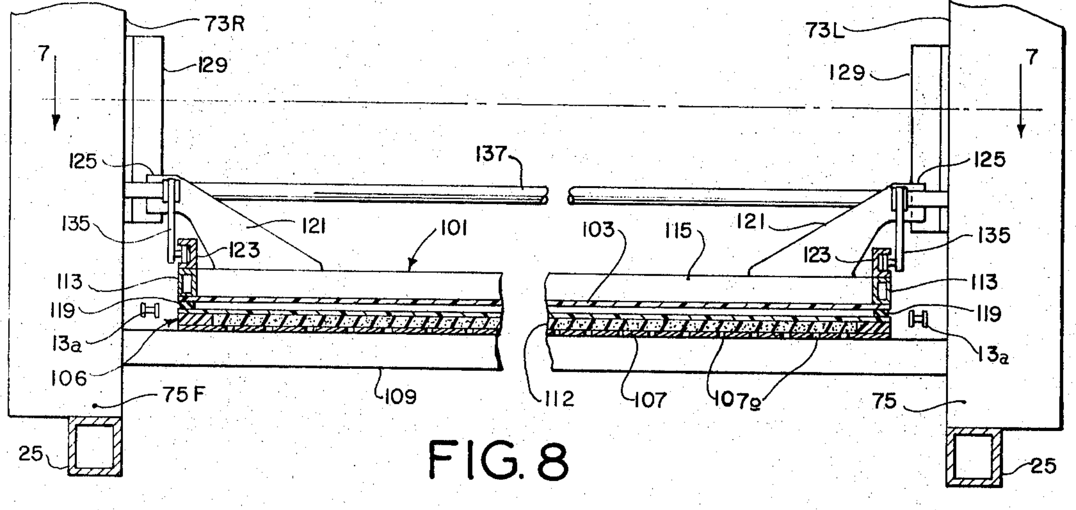
FIG. 8 is a vertical section, broken away at the center, on line 8—8 of FIG. 7.

The pressing means 11 is constituted by a vacuum frame unit comprising a window 101 having a light-transmitting panel 103 (of transparent plastic, for example, such as an acrylic resin), and a flexible resilient presser pad or blanket 105 below the window adapted for vacuum pressing of a plate and a film therebetween (see particularly FIGS. 7, 8 and 19). The blanket 105, which may be made of a suitable rubber, is of rectangular shape in plan, and overlies an open rectangular frame 106 mounted in horizontal position on a horizontal supporting plate 107 carried on rearward and forward cross-bars 109 and 111 spanning the side plates 73L, 73R and 77L, 77R at such an elevation that bars 53 moving along the path of the upper flights 13*a* of chains 13 travel above and closely adjacent the upper surface of the blanket 105. The blanket is cemented to the end members of the open frame 106 as indicated at 105*c*, the blanket being free of the frame between its ends so that it is adapted to flex upward from the frame 106 under a vacuum condition as will appear. Normally, the blanket lies flat on the frame and on an open-cell foam filler 112 (e.g., rubber or polyurethane foam) lying on the plate 107 within the frame 106. The plate 107 has openings 107*o* for passage of air (filler 112, being of open-cell foam, also permitting passage of air).

Figure 3:
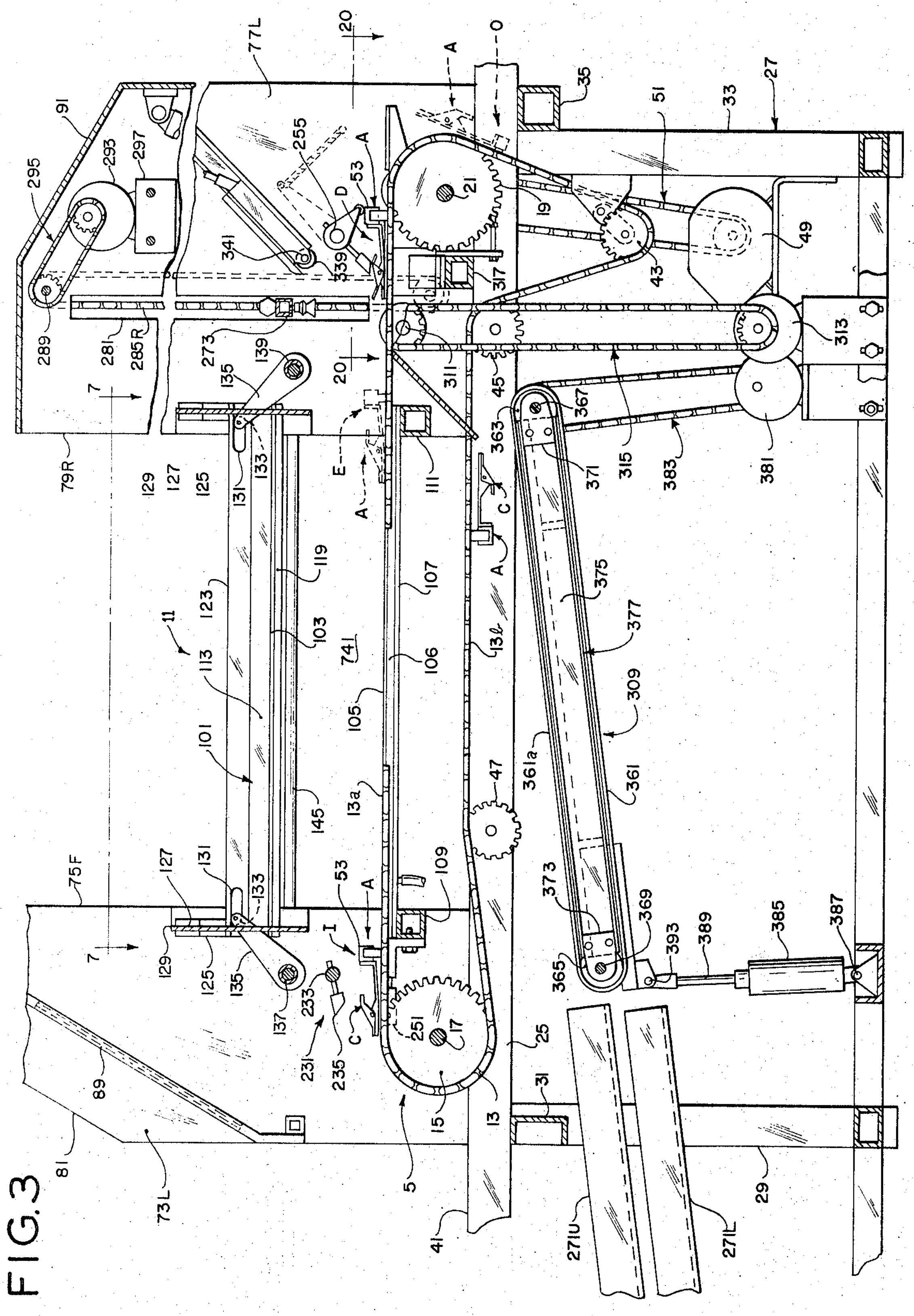
FIG. 3 is a vertical longitudinal section generally on line 3—3 of FIG. 1, with parts broken away, and on a larger scale than FIG. 1.
Figures 4, 5A, 5B, 6:
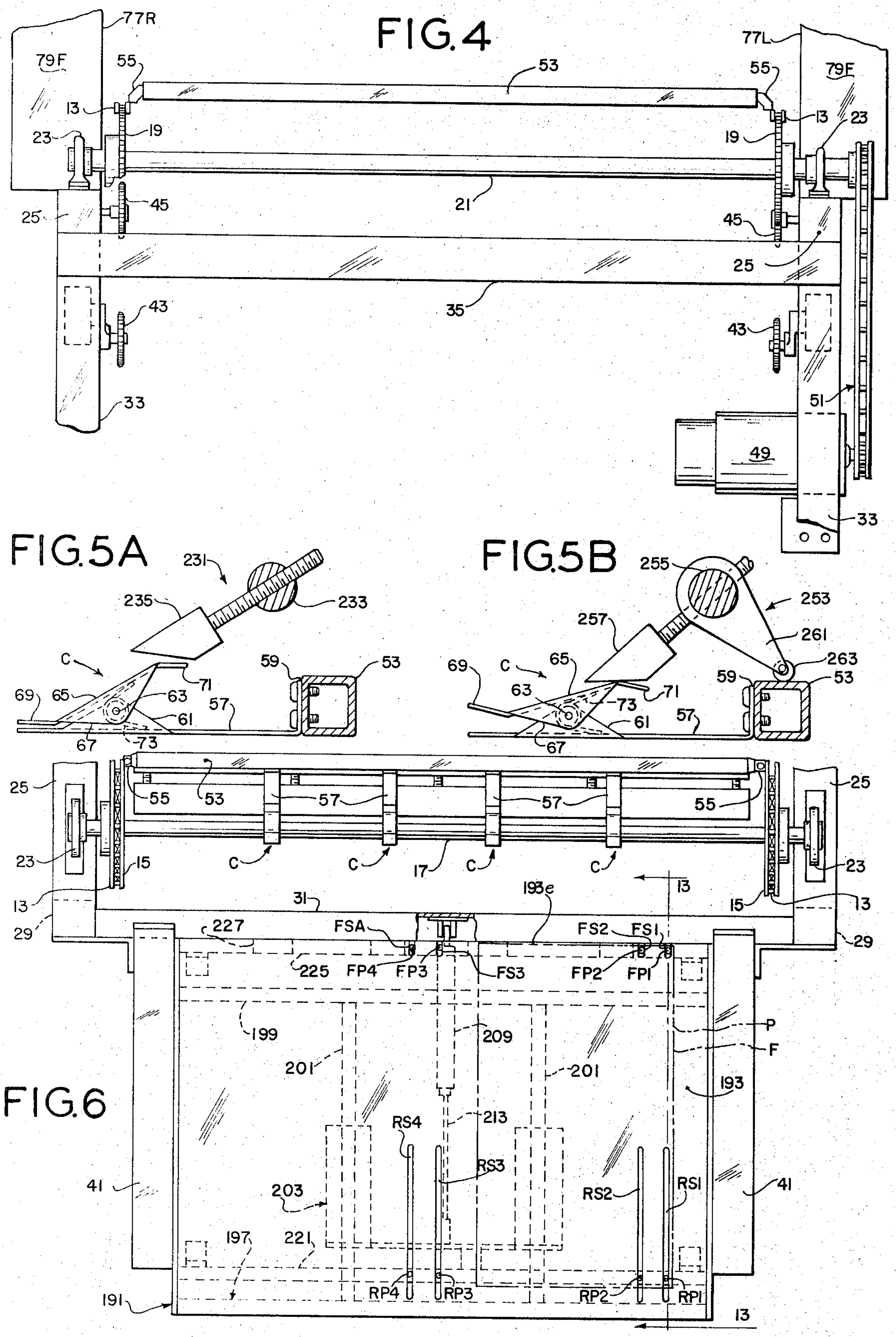
FIG. 4 is a right end view of FIG. 3, with parts broken away and parts omitted.
FIGS. 5A and 5B are enlarged views showing a clamp of the apparatus as it appears when closed at an input station (FIG. 5A) and when opened at an output station (FIG. 5B)
FIG. 6 is an enlarged view of the left end of FIG. 1, with parts broken away to show interior detail.
Figures 11, 12:
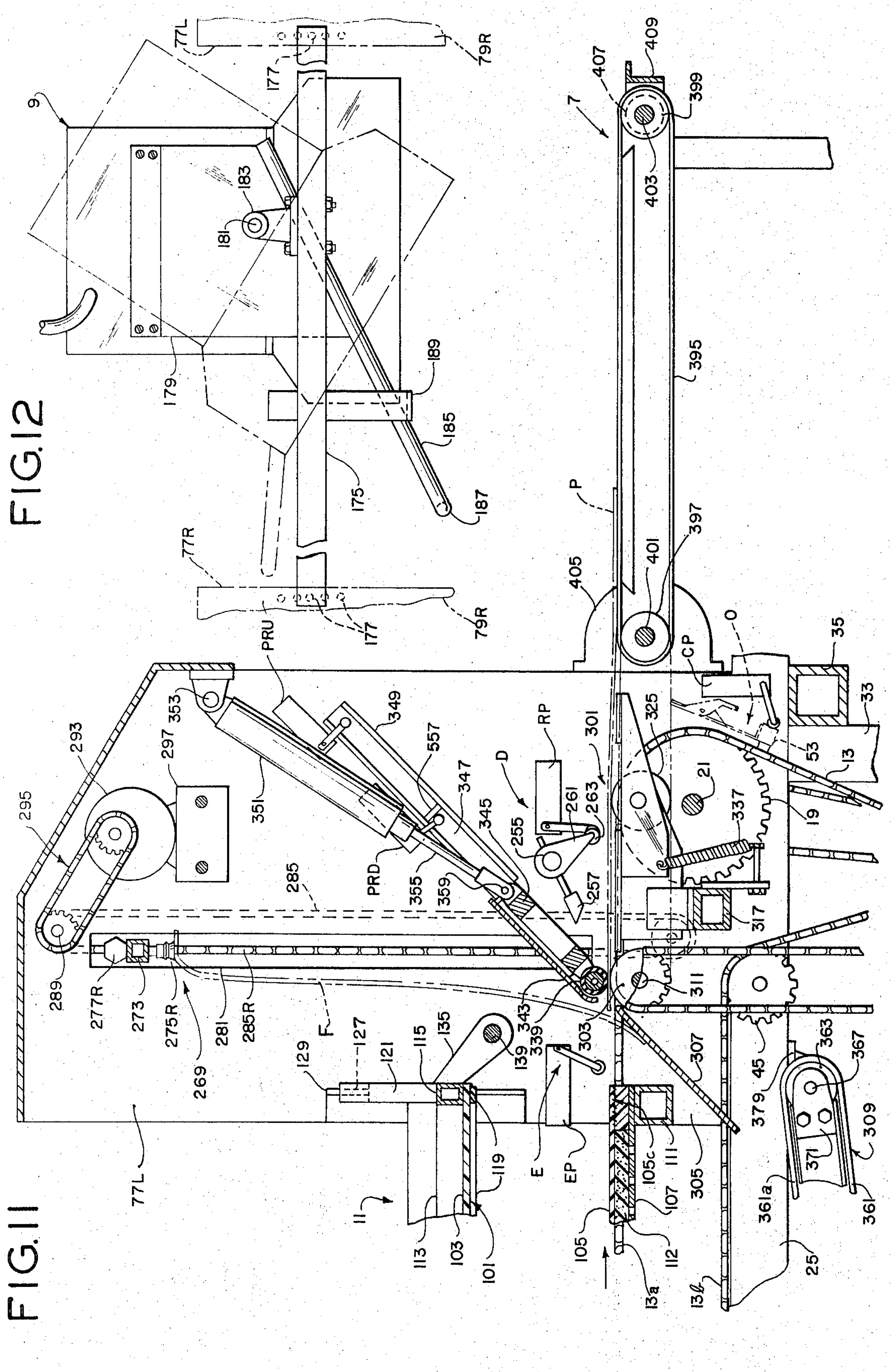
FIG. 11 is an enlarged fragment of FIG. 3, with parts further shown in section, and parts in a moved position.
FIG. 12 is a vertical transverse section on line 12—12 of FIG. 9.

The window 101 comprises an open rectangular window frame carrying the light-transmitting transparent plastic panel 103, the sides of the window frame being designated 113 and its ends being designated 115. The plastic panel 103 is secured to the bottom of the sides and ends of the frame (as by screws), and has upwardly recessed portions 117 adjacent its forward end for a purpose that will appear. The window 101 is mounted for vertical movement toward and away from the top surface of the blanket, and moves between a raised retracted position relative to the blanket as shown in FIGS. 3 and 11 and a lowered closed position as shown in FIG. 8 wherein a peripheral sealing strip 119 (e.g., of foam rubber) adhered to the bottom face of plastic panel 103 around all four sides thereof is an air-tight sealing engagement with the blanket around all four margins of the blanket lying on frame 106. The mounting means for the window comprises guide members 121 secured to the end members 115 of the window frame at the four corners of the frame. These guide members angle upwardly and extend laterally outwardly over cam bars 123 mounted on the side members 113 of the window frame and have vertically slotted extensions 125 at their upper ends reaching laterally outwardly beyond the sides of the window frame. The slots in these extensions are designated 127; they receive vertical guide rails 129 mounted on the side plates 73L and R, 77L and R. Thus, the window 101 is guided for vertical movement at its four corners.

The cam bars 123, which extend the full length of the side members 113 of the window frame 111, have horizontal slots 131 in their outside faces at their ends receiving rollers 133 on the ends of crank arms 135 on a rearward horizontal rock shaft 137 and a forward horizontal rock shaft 139. The rearward rock shaft 137 extends across the apparatus rearward of the window 101, being journalled adjacent its ends in bearings 141 on the rearward side plates 73L and R, and the forward rock shaft 139 extends across the apparatus forward of the window 101 being journalled adjacent its ends in bearings 143 on the forward side plates 77L and R. The two rock shafts are interconnected for conjoint movement by a countershaft 145 extending longitudinally of the apparatus at the left side thereof, journalled in bearings 147 carried by the lateral flanges 75F and 79R of side plates 73L and R and 77L and R and having bevel gears 149 at its ends meshing with bevel gears 151 on the left-hand ends of shafts 137 and 139. Counterweights 153 (see FIG. 9) are provided on the right-hand ends of shafts 137 and 139. Means for rotating the shafts 137 and 139 to rock the crank arms 135 is shown to comprise an air cylinder 155 pivoted at one end on the outside of the right-hand rear side plate 73R as indicated at 157, and having a piston rod 159 extending from a piston 161 therein through its other end to a pin connection at 163 with a crank 165 on shaft 137. The arrangement is such that with the piston rod 159 extended, the window 101 is held in its stated raised retracted position, and on retraction of the piston rod, the window 101 is moved downward to its lowered closed position wherein sealing strip 119 engages the blanket 105.

Figure 19:
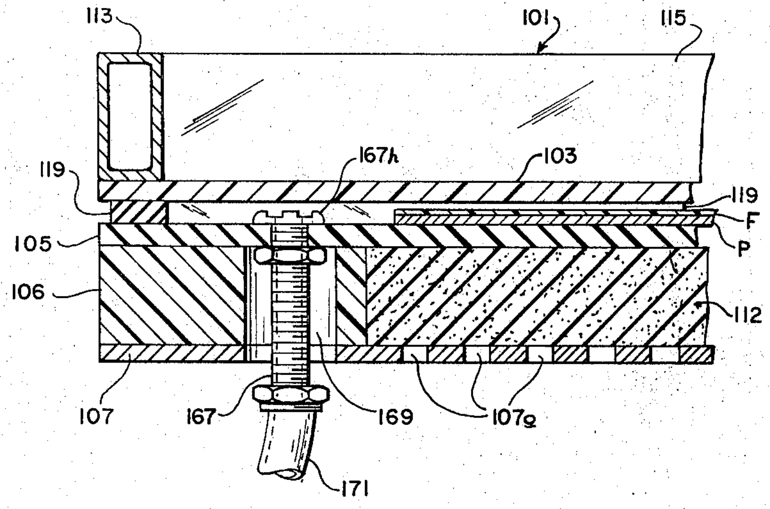
FIG. 19 is an enlarged detail section showing a vacuum fitting.

A tubular fitting 167 extends up through an opening 169 in a side member of frame 106 and has its upper end secured in an opening in the blanket 105 at a point within the confines of sealing strip 119 (see FIG. 19). The fitting has a slotted head 167*h*. A vacuum line 171 is connected to the lower end of the fitting, this line extending from a source of vacuum for drawing a vacuum in the space bounded on the top by the plastic panel 103, on the bottom by the blanket 105 and around on four sides by the sealing strip 119 when the window 101 is lowered.

The light source 7, which may be a high-intensity light source such as an Ascor ADDALUX high source made by Berkey Technical Corporation of Woodside, New York, is mounted in position above the window 101 by means of a pair of horizontal beams 175 extending across the apparatus between side plates 73L and R and 77L and R, being secured to the flanges 75F of 73L and R and the flanges 79R of 77L and R with suitable provision for vertical adjustment of the beams as indicated at 177 in FIG. 12 for vertical adjustment of the light source. The light source is provided at opposite sides thereof with a pair of pivot arms 179 (see FIG. 9) which are pivotally connected at their lower ends as indicated at 181 to brackets 183 on the beams 175. The light source is also provided with a lever 185 having a handle 187 for pivoting it between its operative position shown in solid lines in FIG. 12 and a tilted position shown in dotted lines in FIG. 12 for easier access to the bottom of the light source. A stop 189 for the lever 185 is mounted on the forward beam 175.

The work registration and feed table means 3 (see particularly FIGS. 6 and 13–16) comprises an assembly generally designated 191 comprising a rectangular horizontal guard plate or cover panel 193 spanning a pair of side walls 195 and a rear wall 197 extending between the rearward edges of the side walls, the assembly being open at its forward end and at the bottom. The assembly 191 is mounted in position between legs 39 and side rails 41 with the plate or cover 193 generally at the same level as the horizontal plane of clamps C at station I. The forward edge 193*e* of the plate 193 is spaced some distance back from the rearward end of the upper reach 13*a* of the conveyor 5. A crossbar 199 extends between the side walls 195 of assembly 101 adjacent its forward end. A pair of horizontal guide rods 201 extend longitudinally of the apparatus between the rear wall 197 and this crossbar. A carriage 203 is guided for forward and rearward sliding movement on these rods 201 having tubular guides 205 slidable on the rods. The carriage carries a feed table 207 slidable forwardly and rearwardly directly underneath the fixed work assembling table 193 of assembly 191. Table 207 is cantilevered forward from the carriage 203 and is reciprocable by means of an air cylinder 209 between a rearward retracted position (FIG. 13) wholly underneath plate 193 and a forward extended position projecting out from under plate 193. This cylinder is pivoted at one end (its forward end) as indicated at 211 on bar 31, and has a piston rod 213 extending from piston 215 therein to a pin connection at 217 with a leg 219 extending down from the carriage.

The feed table 107 carries four registration pins RP1–RP4 at its rearward end and four registration pins FP1–FP4 at its forward end. Pins RP1 and FP1 are aligned in a first longitudinal vertical plane of the apparatus adjacent the right side of table 207 and are adapted to be shot up from a lowered retracted position below plate 193 to a raised operative position extending up above plate 193 through rearward and forward slots RS1 and FS1 in the plate 193. Pins RP2 and FP2 are aligned in a second longitudinal vertical plane of the apparatus to the left of and adjacent the plane of pins RP1 and FP1. They are adapted to be shot up from a lowered retracted position below plate 193 to a raised operative position extending up above plate 193 through rearward and forward slots RS2 and FS2 alongside slots RS1 and FS1. Pins RP3 and FP3 are aligned in a third longitudinal vertical plane of the apparatus slightly to the left of the longitudinal vertical central plane of the apparatus. They are adapted to be shot up from a lowered retracted position below plate 193 to a raised operative position extending up above plate 193 through rearward and forward slots RS3 and FS3 in plate 193. Pins RP4 and FP4 are aligned in a fourth longitudinal vertical plane of the apparatus to the left of and adjacent the plane of pins RP3 and FP3. They are adapted to be shot up from a lowered retracted position below plate 193 to a raised operative position extending up above plate 193 through rearward and forward slots RS4 and FS4 in plate 193. The forward slots FS1–4 for the forward pins FP1–4 are relatively short and are open-ended at the forward end of table top plate 193. Each of the rearward shot pins RP1–4 is vertically slidable in a bar 221 at the rearward end of the table 207, each being movable up and down by a spring-return air cylinder 223 extending down from bar 221. Similarly, each of the forward shot pins FP1–4 is vertically slidable in a bar 225 at the forward end of table 207, each being movable up and down by an air cylinder 223. The forward end bar 225 has four recesses 227 in the top thereof each having an inclined bottom 229 slanting up in rearward direction for receiving the lower members 57 of the clamps C when the table 207 moves forward.

The pins RP1–4 and FP1–4 as shown herein are provided for handling one so-called single lithographic plate and negative, i.e., a lithographic plate and negative for a single newspaper page, or two such single lithographic plates and negatives, or a so-called double lithographic plate and double negative, i.e., a lithographic plate and negative for two newspaper pages. For handling one single, pins RP1 and FP1 are shot up; for handling two singles, pins RP1 and FP1 and RP4 and FP4 are shot up; and for handling a double, pins RP2, RP3, FP2 and FP3 are shot up. A single plate and negative have holes for receiving pins RP1 and FP1 (or pins RP4 and FP4) for registering the plate and negative, and a double plate and negative have holes for receiving pins RP2, RP3, FP2 and FP3 for registering the plate and negative.

As previously noted, the main conveyor 5 (chains 13) is intermittently driven to operate the conveyor to index a set A (comprising bar 53 carrying four clamps C) from the first station I (the input station) to the second station E (the exposure station) and, after exposure of the plate P gripped by these clamps, to index the set of clamps A to the third station D (the output station). When the set A moves to the third station D, another set A comes into position at the first station I (the spacing of the sets equalling the distance from I to D). The bar of set A at the first station I is located somewhat rearward of the rearward end of the blanket 105. The bar 53 of set A at station E is located slightly forward of the forward end of the blanket 105 and the clamps C carried thereby are rearward of and adjacent the forward end of the blanket in register with the upwardly recessed portions 117 of the window pane 103. The bar 53 of set A at station D is located just rearward of the forward end of the upper reach 13*a* of conveyor 5.

Means indicated generally at 231 is provided for opening the clamps C of the set A at station I. This means comprises a horizontal rock shaft 233 extending across the apparatus above the rearward end of the upper reach of the conveyor 5 carrying a set of four clamp actuating arms 235 adapted on counterclockwise downward swing from their raised retracted position shown in FIGS. 3 and 5A to engage the fingers 71 of the movable upper clamp jaws 69 to swing the latter upwardly to their open position. Shaft 233 extends between the rearward side plates 73L and R, being journalled adjacent its ends in bearings such as indicated at 237 on these plates. Means for actuating the rock shaft 233 is shown (FIG. 9) to comprise an air cylinder 239 pivoted at one end as indicated at 241 on the outside of plate 73R and having a piston rod 243 extending from a piston 245 therein to a pin connection at 247 with the end of a crank arm 249 on the right-hand end of the rock shaft. Means such as indicated at 251 is provided for supporting the clamps at station I.

Means indicated generally at 253 is provided for opening the clamps C of the set at station D. This means comprises a horizontal rock shaft 255 extending across the apparatus above the forward end of the upper reach of the conveyor 5 carrying a set of four clamp actuating arms 257 adapted on counterclockwise downward swing from their raised retracted position of FIG. 11 to engage fingers 71 and open the clamp jaws 69. Shaft 255 extends between the forward side plates 77L and R, being journalled adjacent its ends in bearings such as indicated at 259 on these plates. Means for actuating the rock shaft 255 is shown to comprise a crank arm 261 on the right-hand end of the shaft carrying a follower roller 263 engageable by a bar 53 as it reaches station D to rock the shaft in the direction for releasing the clamps C carried by that bar 53. The shaft is biased in the opposite direction to raise the arms to their retracted position by a spring 265 connected to an arm 267 on the right-hand end of the shaft.

After a plate P has been placed on the cover panel 193 and a negative F placed on the plate and registered on the appropriate registration pins, for example, pins RP1 and FP1 for a single plate and single negative, the cylinder 209 is actuated to slide the carriage 203 carrying the feed table 207 forward. As the feed table 207 moves forward, the plate P and negative F are moved forward off the panel 193 by the pins RP1 and FP1 (these being raised), plate P being supported by the feed table 207. The clamps C at station I are opened by actuation of the rock shaft 233. The recesses 227 in the bar 225 at the forward end of the feed table 207 receive the rearward ends of the lower jaws 57 of the clamps C at station I, so that the forward end of the plate and negative assembly (which may be referred to as the "registered work") is brought into position overlying the lower clamp jaws 57. Shaft 233 is then rocked back to its FIG. 5A position to disengage arms 235 from the clamp fingers 71 so that clamp jaws 69 swing down to clamp the forward end of the plate and negative assembly against jaws 57, after wihch the pins RP1 and FP1 are retracted. The plate and negative, still registered, are thus clamped to the bar 53 at station I for movement therewith then it next moves to the exposure station E, and, after exposure, when it moves to the output station D. As the bar 53 engages station D, it actuates the rock shaft 255 via engagement with roller 263 on lever 261 to open the clamps C to release the negative F so that it may be removed from the plate P.

Figure 21:
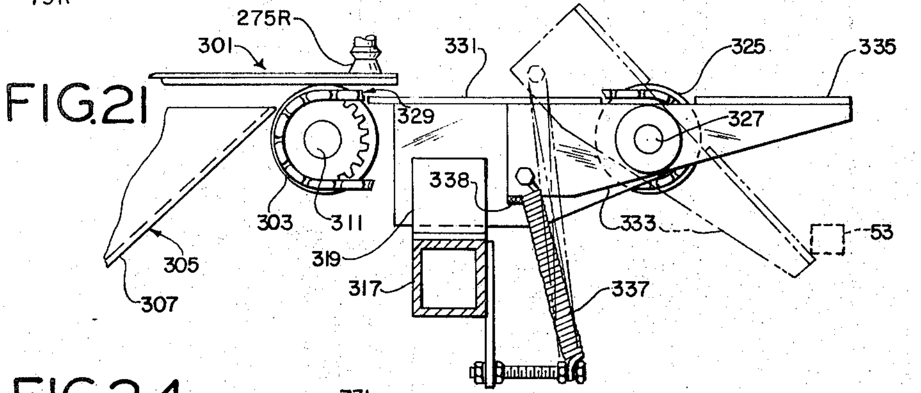
FIG. 21 is a vertical longitudinal section on line 21—21 of FIG. 20.

Means generally designated 269 is provided for picking the film F up off the plate P at station D after opening of the clamps C, and delivering the film back to either an upper inclined tray 271U or a lower inclined tray 271L mounted between the legs 39 and the legs 29 below the table top assembly 191 at the rear end of the apparatus. This means (see particularly FIG. 17) includes a lift bar 273 carrying a left-hand pair of vacuum cups 275L and a right-hand pair of vacuum cups 275R movable up and down in a vertical transverse plane of the apparatus rearward of but adjacent the vertical transverse plane of station D. Each pair of vacuum cups 275L and 275R has a vacuum manifold 277L and R on bar 273 to which is connected a vacuum line 279L and R from the vacuum source. The ends of the bar extend through elongate vertical slots 281 in the forward side plates 77L and R and are connected as indicated at 283 to endless chains 285 on the outside of side plates 77L and R. These chains are trained around upper sprockets 287 on an upper sprocket shaft 289 extending crosswise of the apparatus between side plates 77L and R adjacent their upper ends and lower sprockets 290. Shaft 289 is journalled in bearings 291 on side plates 77L and R and is adapted to be driven in opposite directions by an electric motor 293 (a gearmotor) via a chain and sprocket drive 295. Motor 293 is mounted on a bracket 297 on the left-hand side plate. Bar 273 carrying the vacuum cups is movable downward with the rearward vertical reaches 285R of the chains 285 from the home position in which it is shown in solid lines in FIGS. 3 and 17 to the lowered position shown in phantom in FIGS. 17 and 21 wherein the vacuum cups engage the film F on a plate P at station D, thence to the raised position shown in FIG. 11, and thence back down to the home position. The home position of the bar 273 is above but adjacent the lower end of the rearward vertical reaches 285R of chains 285. The arrangement is such that when the bar 53 dragging behind it an exposed plate P with film F thereon has been indexed forward from station E to station D, vacuum bar 273 may be lowered from its home position, by driving shaft 289 counterclockwise as viewed in FIG. 3 to move the rearward reaches 285R of chains 285 downwardly, for engagement of the vacuum cups with the film; then, with vacuum applied to the cups, bar 273 is raised by driving shaft 289 clockwise as viewed in FIG. 11 to pick the film up off the plate P. When the bar 273 is fully raised, the film (being flexible) hangs down from the vacuum cups as appears in FIG. 11. Then, the bar 273 may be moved back down to its home position and the vacuum in the vacuum cups released (as will appear) so that the film will drop down more or less vertically somewhat forward of the forward end of the blanket 105 and frame 106.

Figure 20:
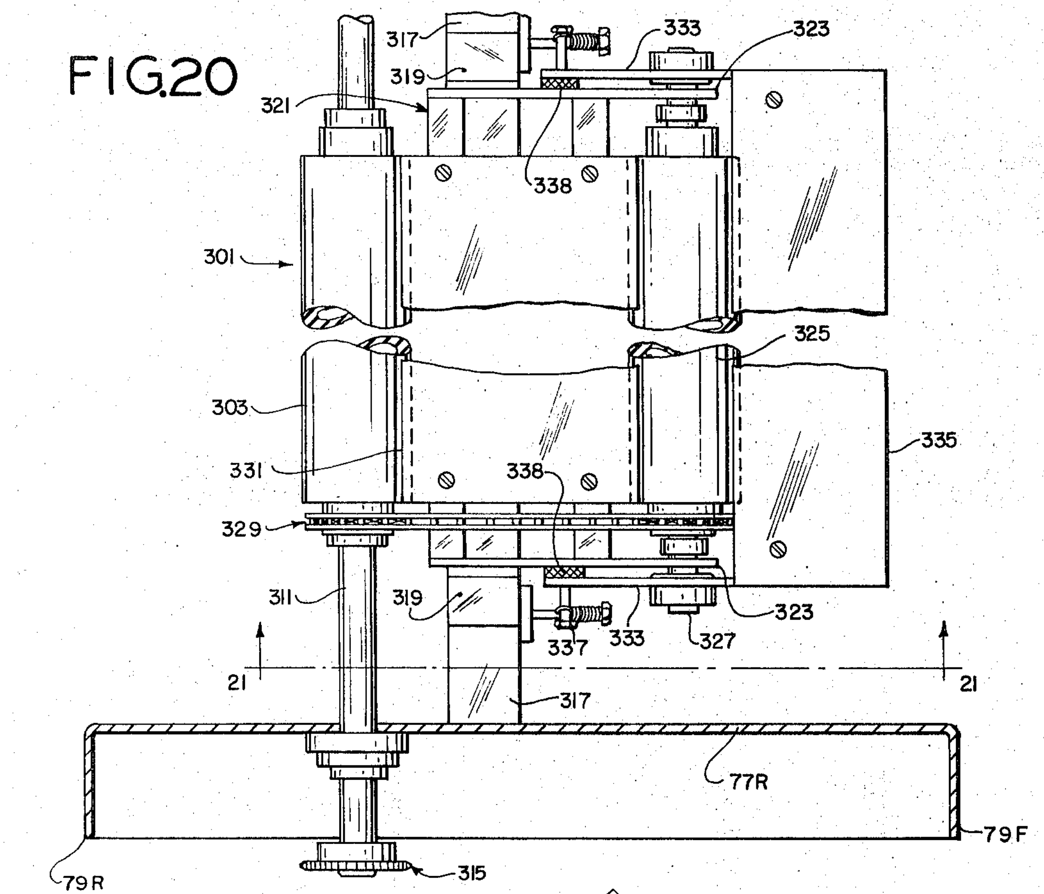
FIG. 20 is an enlarged horizontal section, broken away in the center, generally on line 20—20 of FIG. 3.

Means generally designated 301 (see particularly FIGS. 11, 20 and 21) is provided for feeding an exposed plate P forward after the film F has been stripped from the plate at station D. This means includes a plate drive roll 303 extending horizontally transversely of the apparatus between side plates 77L and R and spaced some distance forward of the forward edge of blanket 105 and frame 106. The top of roll 303 is generally flush with the top surface of the blanket. A film discharge trough 305 is provided between the forward end of the blanket and the roll 303 (i.e., between crossbar 111 and roll 303). This trough has a wall 307 inclined downwardly back from the rearward side of roll 303 underneath the crossbar 111, and is adapted to guide a film F dropping down into the trough onto a film return conveyor 309 located below the blanket and bed plate assembly 105, 107.

The roll 303 has a shaft 311 journalled adjacent its ends in suitable bearings on the side plates 77L and R. It is adapted to be positively driven in the direction for forward feed of an exposed plate P (clockwise as viewed in FIG. 21) by an electric motor 313 via a chain and sprocket drive 315. The shaft 311 extends underneath the upper reaches 13*a* of the chains 13. A crossbar 317 extending between the side plates 77L and R forward of and below roll 303 supports a pair of angles 319 carrying a frame 321 which includes side members 323 welded to the angles extending forward therefrom. A second plate drive roll 325 has a shaft 327 journalled at its ends in the side members 323 adjacent their forward ends and is driven from roll 303 in the same direction as the latter via a chain and sprocket drive 329. A platform 331 extends between the side members 323. Arms 333 pivoted on the ends of shaft 327 carry a platform 335 forward of roll 325. Springs 337 bias arms 333 to swing counterclockwise on the shaft 327 as viewed in FIG. 21 with counterclockwise swing of the arms limited by their engagement with padded stops 338 on the outside of the side members 323 normally to maintain platform 335 horizontal and flush with platform 331. Platform 335 is adapted to be swung downward (clockwise as viewed in FIG. 21) on the axis of shaft 327 by a clamp carrier bar 53 as the bar 53 travels down with chains 13 at the forward end of conveyor 5, and then to swing back up under the bias of springs 337 when bar 53 rides off the end of the platform.

For positive forward feed of a plate P by the driven feed roll 303, the plate P is pinched down on roll 303 by a pinch roll 339. The latter is on a shaft 341 extending between a pair of bearings 343 on a pinch roll frame 345 which extends between side plates 77L and R and which has end members 347 slidable in inclined guideways 349 on the inside of the side plates. The frame 345 carrying the pinch roll 339 is slidable in these guideways by means of an air cylinder 351 between a raised retracted position wherein the pinch roll is spaced above and forward of roll 303 and an operative position engaging a plate P on roll 303 and pinching the plate therebetween for positive plate feed. The air cylinder 351 is pivoted at its upper end as indicated at 353 on a downwardly extending forward flange of 91, and has a piston rod 355 extending from a piston 357 therein through the lower end of the cylinder to a pivotal connection at 359 with the pinch roll frame 345. The arrangement is such that on retraction of the rod 355, the pinch roll 339 is raised, and on extension of the rod 355, the pinch roll 339 is moved down to its operative position.

The film return conveyor 309 is an endless belt conveyor comprising an endless belt 361 trained around rolls 363 and 365 on shafts 367 and 369. These shafts are journalled in bearings 371 and 373 at the ends of side frame members 375 of a conveyor frame 377. Shaft 367 has its ends extending beyond bearings 371 and journalled in bearings 379 mounted on the bottoms of side rails 25 below the forward crossbar 111 for pivoting of the conveyor on the axis of shaft 367, with the conveyor angled downward from shaft 367 toward the rearward end of the apparatus. Shaft 367 is adapted to be driven in the direction for downward travel of the upper reach 361*a* of the belt 361 by an electric motor 381 via a chain and sprocket drive 383. The lower end of the conveyor 309 is shiftable between a raised position wherein the upper reach 361*a* of belt 361 is adapted to feed a film F into the upper tray 271U and a lowered position wherein the upper reach of the belt is adapted to feed a film into the lower tray 271L by an air cylinder 385 pivoted as indicated at 387 at its lower end and having a piston rod 389 extending from a piston 391 therein through its upper end to a pin connection at 393 with the lower end conveyor. The trays extend forward past the legs 29 on the frame 27. The upper tray 271U is for films which are to be re-run through the apparatus, and the lower tray 271L is for negatives which are not to be re-run.

The auxiliary or output conveyor 7 is an endless belt conveyor comprising an endless belt 395 trained around rolls 397 and 399 on shafts 401 and 403. Shaft 401 is journalled at its ends in bearings 405 mounted on the forward flanges of side plates 77L and R. Shaft 403 is journalled in bearings 407 at the outer end of a conveyor frame 409 pivoted on the shaft 401. Shaft 401 is adapted to be driven in the direction for travel in forward direction away from the forward end of the housing 1 of the upper reach 395*a* of the belt 395 by means of a chain and sprocket drive 411 from shaft 311.

Figure 22:
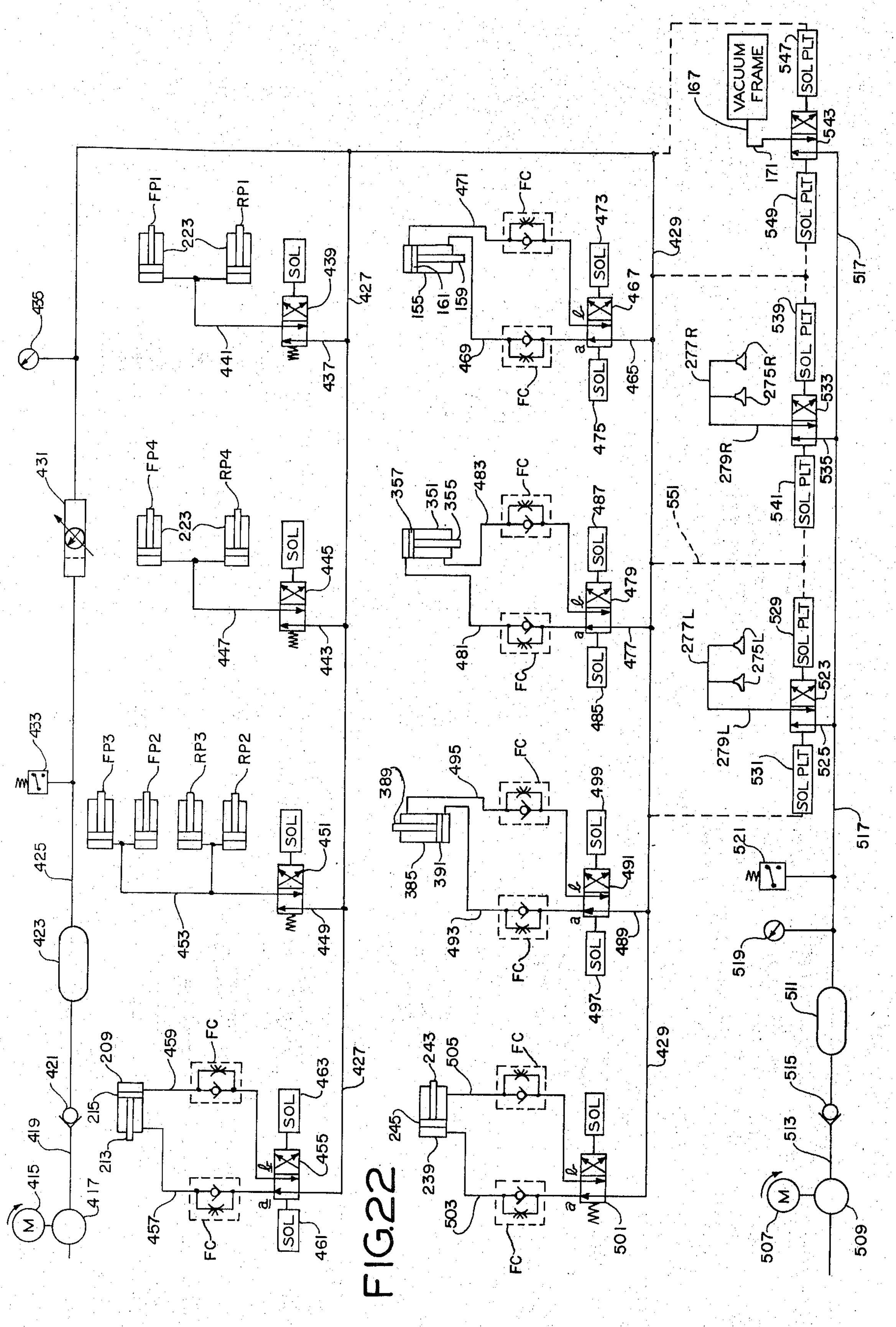
FIG. 22 is a compressed air and vacuum circuit diagram.

Referring to FIG. 22, there is indicated at 415 an electric motor driving an air compressor 417 supplying compressed air via line 419 including a check valve 421 to a receiver tank 423. An air line 425 extending from the receiver tank 423 supplies compressed air to two branch lines 427 and 429. Line 425 includes a pressure regulator 431, and a pressure switch 433 is connected to line 425 between the tank 423 and the regulator 431. A pressure gauge is indicated at 435.

Branch line 427 feeds an air line 437 to a four-way solenoid valve 439 having an air line 441 extending therefrom to the air cylinders 223 for the first pair of single plate register pins RP1 and FP1. It also feeds an air line 443 to a four-way solenoid valve 445 having an air line 447 extending therefrom to the air cylinders 223 for the second pair of single plate register pins RP4 and FP4, and an air line 449 to a four-way solenoid valve 451 having an air line 435 extending therefrom to the four cylinders 223 for the double plate register pins RP2, RP3, FP2 and FP3. When any one of valves 439, 445 or 451 is deenergized, the respective pins are retracted and when it is energized the respective pins are extended. Line 427 extends to a four-way double solenoid valve 455 having ports *a* and *b* connected by lines 457 and 459 including flow controls FC to opposite ends of the air cylinder 209 for advancing and retracting the feed table 207. When the solenoid 461 of valve 455 is energized, air is supplied to the rear end of cylinder 209 and vented from its forward end to advance the feed table 207, and when the other solenoid 463 of valve 455 is energized air is supplied to the forward end of cylinder 209 and vented from its rear end to retract the feed table.

Branch line 429 feeds an air line 465 to a four-way double solenoid valve 467 having ports *a* and *b* connected by lines 469 and 471 including flow controls FC to opposite ends of the air cylinder 155 for raising and lowering the window 101. When the solenoid 473 of the vlave 467 is energized, air is supplied to the upper end of the cylinder 155 and vented from its lower end to raise the window 101, and when the other solenoid 475 of the valve 467 is energized, air is supplied to the lower end and vented from the upper end of the cylinder 155 to lower the window 101. Branch line 429 also feeds an air line 477 to a four-way double solenoid valve 479 having ports *a* and *b* connected by lines 481 and 483 including flow controls FC to opposite ends of the air cylinder 351 for raising and lowering the pinch roll 339. When the solenoid 485 of the valve 479 is energized, air is supplied to the upper end of cylinder 351 and vented from its lower end to lower the pinch roll, and when the other solenoid 487 of valve 479 is energized, air is supplied to the lower end of cylinder 351 and vented from its upper end to raise the pinch roll. Branch line 429 also feeds an air line 489 to a four-way double solenoid valve 491 having ports *a* and *b* connected by lines 493 and 495 including flow controls FC to opposite ends of the cylinder 385 for raising and lowering the film return conveyor 309. When the solenoid 497 of valve 491 is energized, air is supplied to the lower end of cylinder 385 and vented from its upper end to raise the conveyor 309 for delivery of films to the upper tray 271U, and when the other solenoid 499 of valve 491 is energized, air is supplied to the upper end of cylinder 385 and vented from its lower end to lower the conveyor 309 for delivery of films to the lower tray 271L. Branch line 429 connects to a four-way single solenoid valve 501 having ports *a* and *b* connected by lines 503 and 505 including flow controls FC to opposite ends of air cylinder 239 for operating the clamp release shaft 233. When the solenoid of valve 501 is deenergized, the piston rod 243 of cylinder 239 is extended and the clamps C are closed; when the solenoid is energized, the piston rod 243 is retracted and the clamps C are opened.

Still referring to FIG. 22, there is indicated at 507 an electric motor driving a vacuum pump 509 which draws a vacuum in a receiver tank 511 via vacuum line 513 including a check valve 515. A vacuum line 517 connected to the tank 511 has a vacuum gauge 519 and a pressure switch 521 connected thereto. Line 517 is the source of vacuum for the line 171 connected to the fitting 167. A four-way double solenoid valve 523 with an external pilot supply is connected by a line 525 to line 517 and by the line 279L to the manifold 277L for the two left-hand vacuum cups 275L. When the solenoid 529 of this valve is energized, the vacuum cups are vented and when the other solenoid 531 of this valve is energized, the cups are connected to line 517 for drawing a vacuum therein. A four-way double solenoid valve 533 with an external pilot supply is connected by a line 535 to line 517 and by the line 279R to the manifold 277R for the two right-hand vacuum cups 275R. When the solenoid 539 of valve 533 is energized, the cups are vented and when the other solenoid 541 of valve 533 is energized, the cups are connected to line 517 for drawing a vacuum therein. Finally, vacuum line 517 is connected to a four-way double solenoid valve 543 with an external pilot supply and line 171 extends from this valve to the vacuum frame fitting 167. When solenoid 547 of this valve is energized, the line 171 is vented and when the other solenoid 549 of this valve is energized, line 171 is connected to line 517 for drawing a vacuum in the space bounded by the plastic window panel 103, the blanket 105 and the sealing strip 119 when the window 101 is lowered. An external pilot supply system fed by line 429 is indicated at 551.

Figures 13, 14:
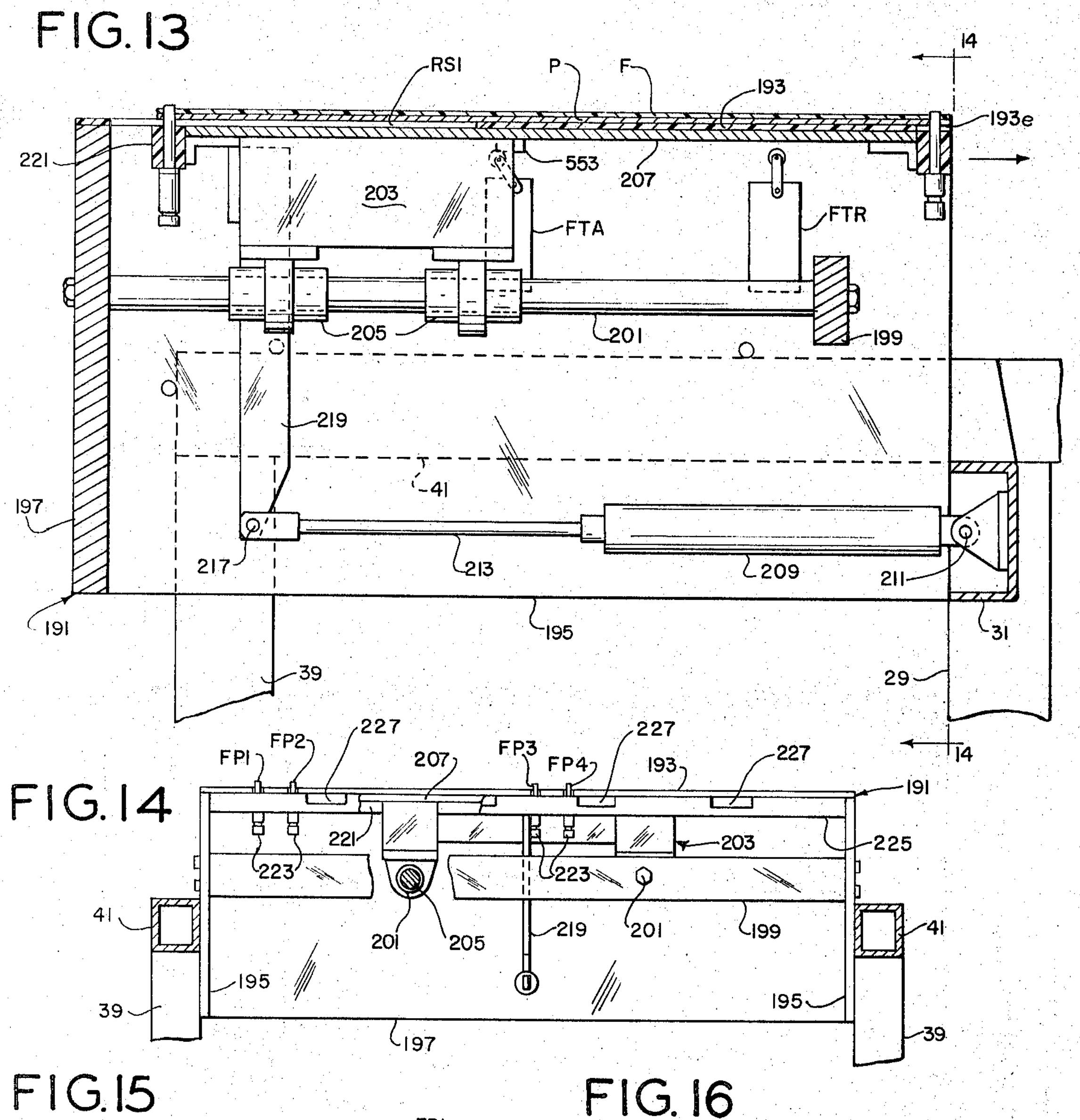
FIG. 13 is an enlarged vertical longitudinal section generally on line 13—13 of FIGS. 1 and 6.
FIG. 14 is a view on line 14—14 of FIG. 13, with parts broken away.
Figure 15:
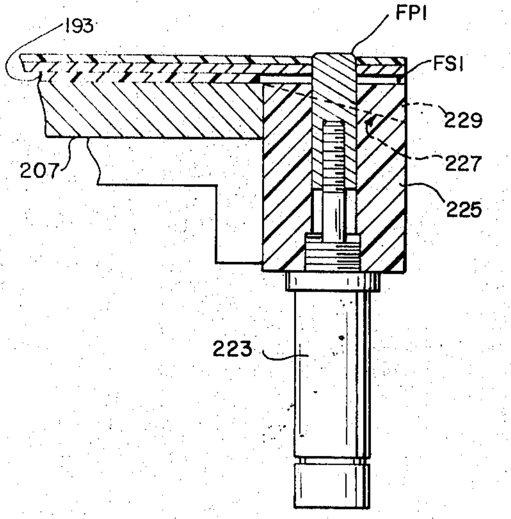
FIG. 15 and 16 are enlarged fragments of FIG. 13 showing certain details.
Figure 16:
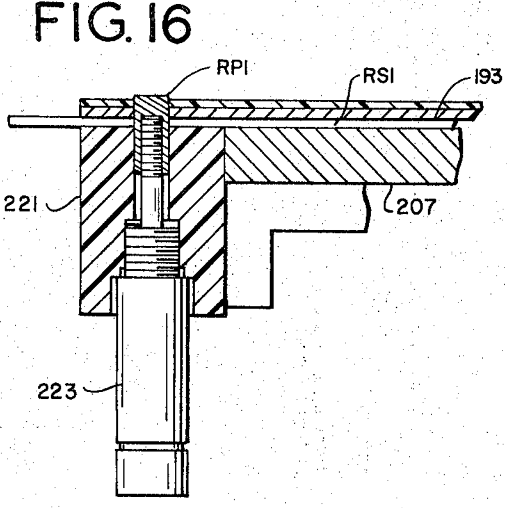

The feed table 207, via a lug 553, controls two limit switches FTA and FTR (see FIG. 13). Referring to FIGS. 23A, B, switch FTA has contacts FIA1 and FTA2 which are normally open and contacts FTA3 which are normally closed, FTA1 and FTA2 being closed and FTA3 being opened when the feed table is moved rearward to its FIG. 13 position. Switch FTR has a single set of contacts FTR1 (FIG. 23A) which are normally open, and which close when the feed table is moved forward. An arm 555 on the left end of rock shaft 233 controls a limit switch CC (see FIG. 10) having contacts CC1 and CC2 which are held open and contacts CC3 which are held closed by arm 555 when the clamps C at station I are closed; CC1 and CC2 are closed and CC3 is opened when arm 555 swings down on opening the clamps. Arm 165 on shaft 137 controls a limit switch VFU (see FIG. 9) having contacts VFU1 which are open and contacts VFU2 which are closed when the vacuum frame window 101 is lowered; VFU1 close and VFU2 open when the window 101 is raised. Arm 165 on shaft 137 also controls a limit switch VFD (see FIG. 9) having contacts VFD1 which are closed and contacts VFD2 which are open when the window 101 is raised; VFD1 open and VFD2 close when the window is lowered. The pinch roll frame 345 controls two limit switches PRU and PRD actuated by a lug 557 on one of the end members 347 of the frame (see FIG. 11); PRU has two sets of contacts PRU1 and PRU2 which are open when the frame 345 is down and which close when the frame is raised; PRD has a single set of contacts PRD1 which are open when the frame 345 is raised and which close when the frame is moved down. The vacuum cup lift bar 273 via a lug 559 on the right-hand chain 285 controls three limit switches VCU, VCD and VCB (see FIG. 9). Switch VCU has contacts VCU1 which are closed when the bar is down; VCU1 open when the bar is raised to the top of its stroke. Switch VCD has contacts VCD1 which are closed, contacts VCD2 which are open and VCD3 which are open when the bar is up; VCD1 open and VCD2 and VCD3 close when the bar is moved down to its home position. Switch VCB has contacts VCB1 which are closed and VCB2 which are open and VCB3 which are closed when the bar is up; VCB1 and VCB3 open and VCB2 close when the bar is lowered to the bottom of its stroke. Each bar 53 on chains 13 controls a limit switch RP at station D (see FIG. 11) having normally closed contacts RP1 and normally open contacts RP2; RP1 open and RP2 are closed when a bar 53 reaches station D (and thus when a bar 53 reaches station I). Each bar 53 on chains 13 also controls a limit switch EP at station E (see FIG. 11) having normally closed contacts EP1 and open contacts EP2; EP1 open and EP2 close when the bar 53 reaches station E. Each bar 53 further controls a limit switch CP (see FIG. 11) having normally closed contacts CP1 and normally open contacts CP2; CP1 open and CP2 close when a bar travelling down at the forward end of the conveyor 5 reaches the clearance position 0.

Figures 23, 23C:
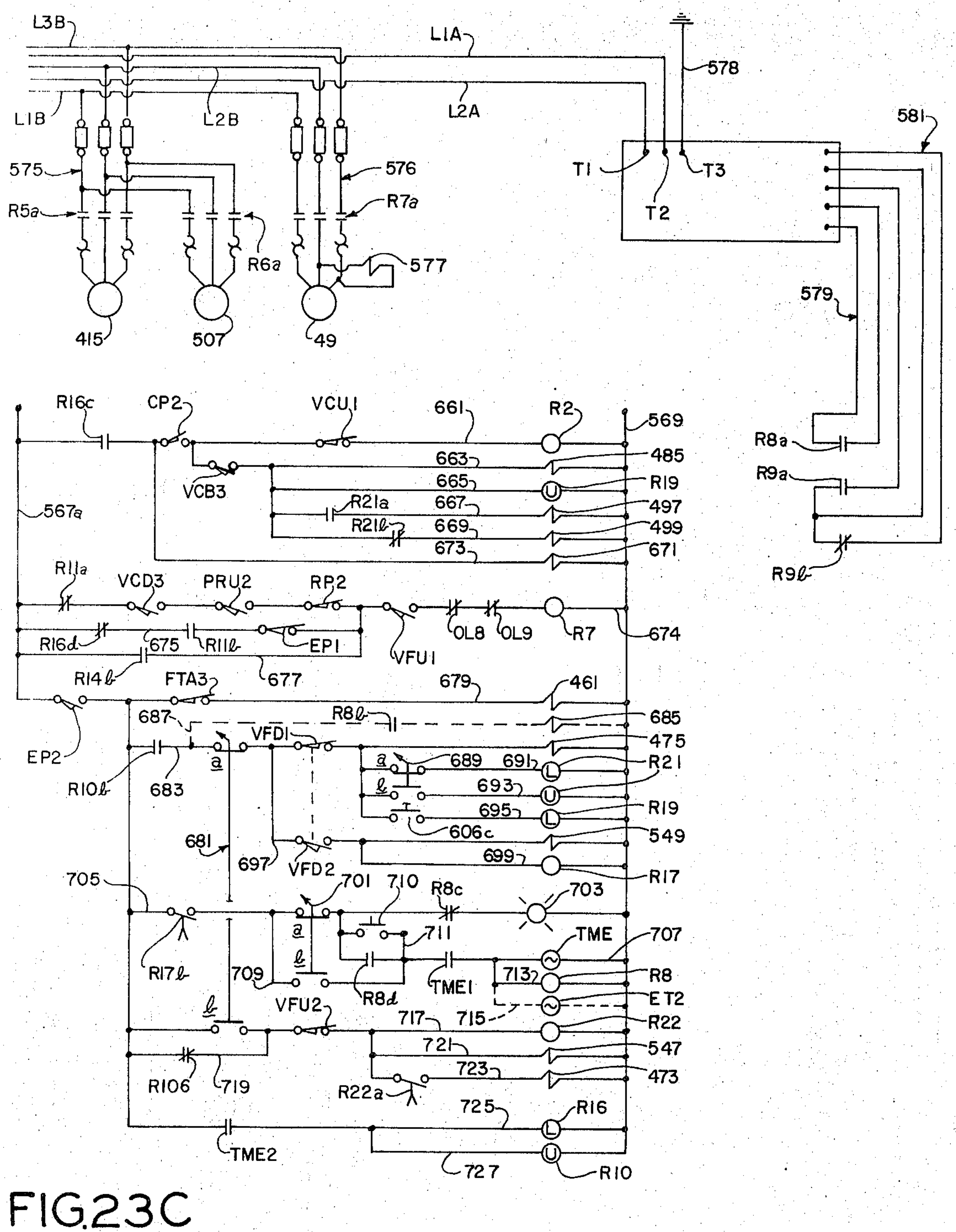
FIGS. 23A, B and C together constitute a wiring diagram.
Figure 23A:
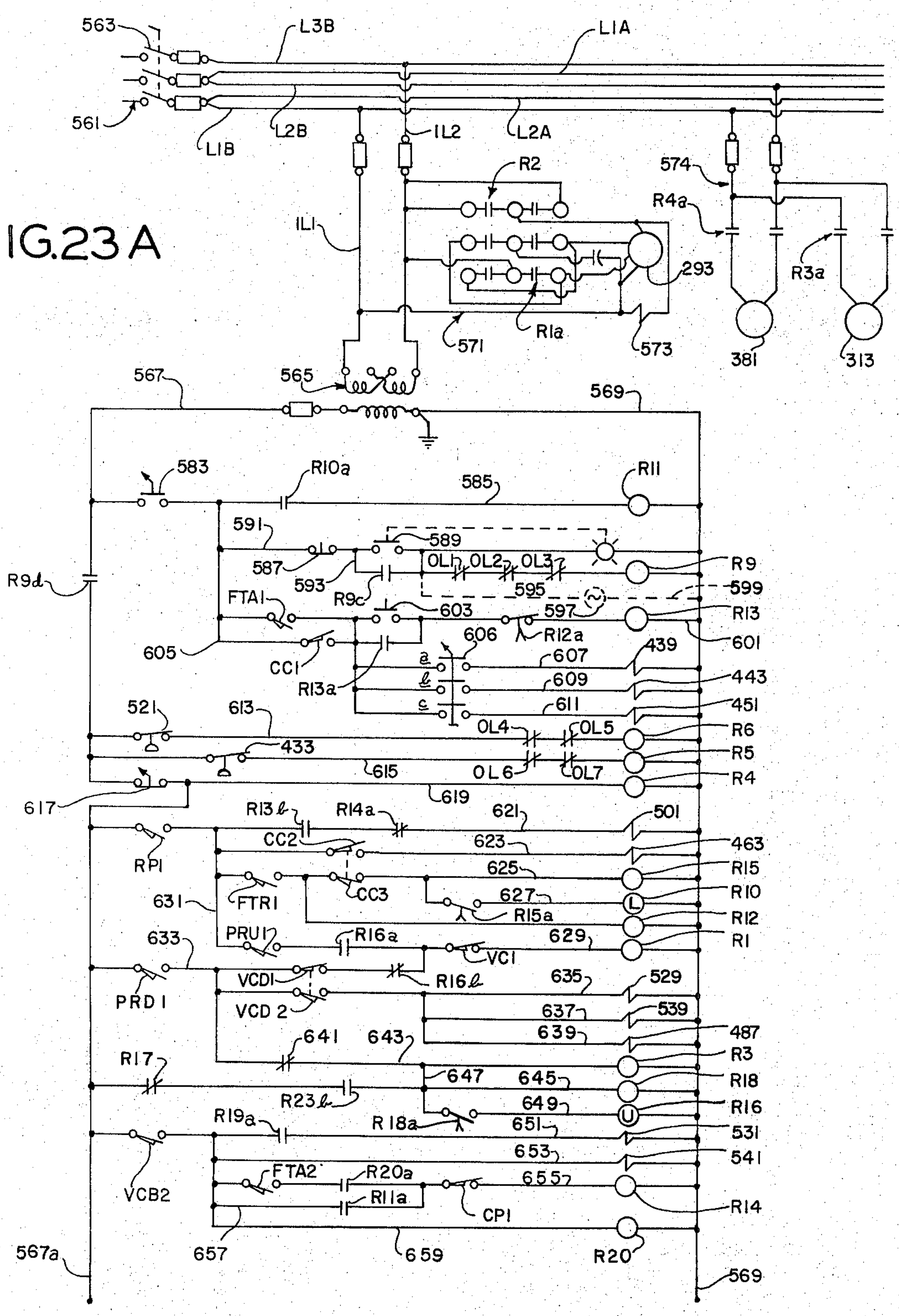

Now referring to FIGS. 23A–C showing the electrical circuitry of the apparatus, there is indicated at 561 a three-phase a.c. power supply supplying via a disconnect switch 563 lines L1A and L1B, lines L2A and L2B and line L3B. At 565 is indicated a transformer having its primary connected across lines L1B and L3B by line 1L1 and 1L2 and its secondary feeding lines 567 and 569. The motor 239 for driving the chains 285 to move the vacuum cups 275 up and down is a reversible motor connected across lines 1L1 and 1L2 in a circuit 571, including a set of normally open contacts R1*a* of a vacuum cup down relay R1 and a set of normally open contacts R2*a* of a vacuum cup relay R2. When relay R1 is energized, contacts R1a close to energize motor 293 for being driven in the direction to lower the vacuum cups 275, and when relay R2 is energized, contacts R2*a* close to energize motor 293 for being oppositely driven to lift the vacuum cups. The motor 293 has an electric brake, the coil of which is indicated at 573 in FIG. 23A. The motor 313 for driving roll 303 and the motor 381 for conveyor 309 are connected across lines L1B and L2B in a circuit 574 including a set of normally open contacts R3*a* of a relay R3 for the motor 313 and a set of normally open contacts R4*a* of a relay R4 for the motor 381. The air compressor motor 415 and the vacuum pump motor 507 are connected in parallel across lines L1B, L2B and L3B in a circuit 575 including a set of normally open contacts R5*a* of a relay R5 for the motor 415 and a set of normally open contacts R6*a* of a relay R6 for the motor 507. The chain conveyor motor 49 is connected to lines L1B, L2B and L3B in a circuit 576 including normally open contacts R7*a* of a relay R7. This motor has an electric brake, the coil of which is indicated at 577. Lines L1A and L2A are connected to terminals T1 and T2 of the light source 9 with a third terminal T3 grounded as indicated at 578. A first control circuit 579 for unit 9 includes a set of normally open contacts R8*a* of a relay R8, and a second control circuit 581 for the unit 9 includes a set of normally open contacts R9*a* and a set of normally closed contacts R9*b* of a relay R9. When relay R8 is energized to close contacts R8*a*, a shutter of unit 9 is opened and power to a lamp of the unit is increased; when R8 is de-energized, contacts R8*a* open, and the shutter closes and the power is reduced. When relay R9 is energized to close contacts R9*a* and open contacts R9B, a blower of the unit 9 is operated.

A normally open rotary on-off switch 583, normally open contacts R10*a* of a latch relay R10 and the coil of a relay R11 are connected in series in a line 585 across lines 567 and 569. A normally closed STOP switch 587 is series-connected with a normally open illuminated pushbutton START switch 589 in a line 591 in parallel around contacts R10*a* and relay R11. Contacts R9*c* of relay R9 are connected in parallel around the start switch 589 as indicated at 593. Normally closed thermal overload contacts of motors 293, 381 and 313, 0L1, 0L2 and 0L3 and the coil of relay R9 are series-connected in a line 595 energized via the START switch 589 when closed and via contacts R9*c* when closed. A clock 597 may be connected as indicated at 599 for indicating the total ON time of the apparatus. A line 601 including the contacts FTA1, a normally open "Feed Table Loaded" pushbutton switch 603, time-delayed opening contacts R12*a* of a relay R12 and the coil of a relay R13 are connected in parallel with line 591. The normally open contacts CC1 of limit switch CC are connected in parallel with contacts FTA1 as indicated at 605. Normally open contacts R13*a* of relay R13 are connected in parallel around switch 603. Solenoid valve 439 for the first single plate registration pins RP1 and FP1 is series-connected with a set of contacts *a* of a rotary selector switch 606 in a line 607 fed either via FTA1 or CC1. Solenoid valve 445 for the second single plate pins RP4 and FP4 is series-connected with a second set of contacts *b* of switch 606 in a line 609 parallel with line 607. Solenoid valve 451 for the double plate pins RP2, 3 and FP2, 3 is series-connected with a third set of contacts *c* of the switch 606 in a line 611 in parallel with lines 607 and 609. The rotary switch 606 is a three-position switch, its contacts *a* alone being closed in a first position, its contacts *a* and *b* being closed in its second position, and its contacts *c* alone being closed in its third position. Line 567 includes contacts R9*d* of relay R9 controlling all lines from line 567 to line 569 past (below) line 585.

Pressure switch 521 for vacuum line 517 is connected in a line 613 across 567 and 569 in series with normally closed thermal overload switches OL4 and OL5 of motor 507 and the coil of relay R6. Pressure switch 433 for the compressed air line 425 is connected in a line 615 across 567 and 569 in series with normally closed thermal overload contacts OL6 and OL7 of motor 415 and the coil of relay R5. A rotary switch 617 is connected in line 567 beyond line 615. This switch 617 is normally closed for automatic operation of the apparatus, and is opened for manual operation of the apparatus. The portion of line 567 beyond switch 617 (and under the control thereof) is especially designated 567*a*. The coil of relay R4 is connected across line 567*a* and 569 in a line 619. The limit switch contacts RP1, normally open contacts R13*b* of relay R13, normally closed contacts R14*a* of a relay R14, and the clamp solenoid valve 501 are connected in series in a line 621 across lines 567*a* and 569. Normally open contacts CC2 of limit switch CC and the table-forwarding solenoid 463 of the feed table valve 455 are series-connected in a line 623 in parallel with contacts R13*b* and R14*a* and solenoid valve 501. Contacts FTR1, normally closed contacts CC3 of limit switch CC and the coil of a time delay relay R15 are series-connected in a line 625 in parallel with line 623. Contacts R15*a* of relay R15 and the latch coil of latch relay R10 are series-connected in a line 627 in parallel with relay R15. The coil of relay R12 is connected in a line 629 in parallel with contacts CC3 and relay R15. Contacts PRU1, normally open contacts R16*a* of a latch relay R16, contacts VCB1 and the coil of relay R1 are series-connected in a line 631 in parallel with lines 623 and 625. Contacts PRD1 are connected in series with contacts VCD1 of limit switch VCD, normally closed contacts R16*b* of latch relay R16, and VCB1 and R1 via a line 633 from 567*a* to 631. Contacts VCD2 of switch VCD and the OFF solenoid 529 of the valve 523 for the left vacuum cups 275L are series-connected in a line 635 in parallel with VCD1, R16*b*, VCB1 and R1. The OFF solenoid 539 of the valve 533 for the right-hand vacuum cups 275R and the UP solenoid 487 of the valve 479 for the pinch roll operating cylinder 351 are connected in parallel with one another and with solenoid 529 as indicated at 637 and 639. A set of normally closed contacts of an interlock 641 is connected in series with the coil of relay R3 in a line 643 in parallel with line 635. Normally closed contacts R17*a* of a relay R17, normally open contacts R3*b* of relay R3 and the coil of a time delay relay R18 are series-connected in a line 645 across 567*a* and 569 with a connection at 647 whereby R18 is in parallel with R3. Contacts R18*a* of relay R18 and the unlatching coil of relay R16 are connected in series in a line 649 in parallel with relay R18. Contacts VCB2 are connected in series with normally open contacts R19*a* of a latch relay R19 and the ON solenoid 531 of valve 523 for the left-hand vacuum cups 275L in a line 651 across lines 567*a* and 569. The ON solenoid 541 of the valve 533 for the right-hand vacuum cups 275R is connected in parallel with contacts R19*a* and solenoid 531 via a line 653. Contacts FTA2, normally open time-delay closing contacts R20*a* of relay R20, contacts CP1, and the coil of relay R14 are series-connected in a line 655 in parallel with line 653. Normally open contacts R11*a* of relay R11 are connected in a line 657 in parallel with limit contacts FTA2 and contacts R20*a*. The coil of relay R20 is connected in a line 659 in parallel with line 655. Normally open contacts R16*c* of latch relay R16, the normally open contacts CP2 of limit switch CP, the normally closed contacts VCU1 of switch VCU and the coil of relay R2 are series-connected in a line 661 across lines 567*a* and 569. Contacts VCB3 of limit switch VCB are series-connected with the DOWN solenoid 485 of valve 479 for the pinch roll cylinder 351 in a line 663 in parallel with contacts VCU1 and relay R2. The unlatching coil of latch relay R19 is connected in a line 665 in parallel with solenoid 485. Normally open contacts R21*a* of a latch relay R21 and solenoid 497 of valve 491 for cylinder 385 are series-connected in a line 667 in parallel with line 665. Normally closed contacts R21*b* of latch relay R21 and solenoid 499 of valve 491 for cylinder 385 are series-connected in a line 669 in parallel with line 667. The reset clutch 671 of an exposure timer TME in series-connected in a line 673 in parallel with CP2, VCU1 and R2.

Normally closed contacts R11*a* of relay R11, contacts VCD3, PRU2, RP2, VFU1, normally closed thermal overload contacts OL8 and OL9 of motor 49 for driving the chain conveyor 5 and the motor 49 are series-connected in a line 674 across lines 567*a* and 569. Normally closed contacts R16*d* of relay R16, normally open contacts R11*b* of relay R11 and normally closed contacts EP1 are series-connected in a line 675 in parallel with contacts R11*a*, VCD3, PRU2 and RP2. Normally open contacts R14*b* of relay R14 are connected in a line 677 in parallel with line 675.

Contacts EP2 and FTA3 of limit switches EP and FTA and the feed table return solenoid 461 of valve 455 are series-connected in a line 679 across lines 567*a* and 569. Normally open contacts R10*b* of relay R10, normally closed contacts *a* of a rotary switch 681, upper contacts VFD1 (normally closed) of limit switch VFD and the DOWN solenoid 475 of valve 467 for the window 101 are series-connected in a line 683 in parallel with FTA3 and 463. Normally open contacts R8*b* of relay R8 and an exposure counter 685 may be series-connected in a line 687 in parallel with 681*a*, VFD1 and 475. Normally closed contacts *a* of a return stack rotary switch 689 are series-connected with the latching coil of latch relay R21 in a line 691 in parallel with solenoid 475. Normally open contacts *b* of this rotary switch 689 are series-connected with the unlatching coil of relay R21 in a line 693 in parallel with line 691. Contacts *c* of rotary switch 606 are series-connected with the latching coil of latch relay R19 in a line 695 in parallel with line 693. The lower contacts VFD2 (normally open) of limit switch VFD are series-connected with the ON solenoid 549 of the vacuum frame valve 543 in a line 697 in parallel with VFD1 and 475. The coil of relay R17 is series-connected in a line 699 in parallel with solenoid 549.

Normally open contacts R17*b* (time delayed in closing) of relay R17, normally closed contacts *a* of a "Hold for Inspection" rotary switch 701, normally closed contacts R8*c* of relay R8, and a "Ready to Inspect" lamp 703 are series-connected in a line 705 in parallel with line 683. Normally open contacts R8*d* of relay R8, contacts TME1 of timer TME and the motor of timer TME are series-connected in a line 707 in parallel with R8*c* and 703. Normally open contacts *b* of switch 701 are connected as indicated at 709 around 701*a* and R8*d*. An "Inspection Release" switch 710 (normally open) is connected around R8*d* as indicated at 711. The coil of relay R8 is connected in a line 713 around the motor of timer TME. A total exposure time clock ET2 may be connected in parallel with R8 as indicated at 715. Normally open contacts *b* of rotary switch 681, normally closed contacts VFU2 of limit switch VFU and the coil of a time delay relay R22 are series-connected in a line 717 in parallel with lines 683 and 705. Normally closed contacts R10*c* of relay R10 are connected in a line 719 around contacts 681*b*. The OFF solenoid 547 of the vacuum frame valve 543 is connected in a line 721 in parallel with R22. The UP solenoid 473 of valve 467 for the window 101 is series-connected with normally open contacts R22*a* of relay R22 in a line 723 in parallel with 547. Contacts TME2 of the timer TME are series-connected with the latching coil of relay R16 in a line 725 in parallel with line 717. The unlatching coil of relay R10 is connected in a line 727 in parallel with the latching coil of R16.

When the timer reset clutch 671 is energized (on) to reset the timer TME to zero, the timer motor is off, contacts TME1 are closed, and contacts TME2 are open. When the timer motor is energized to time out an exposure interval, the clutch 671 is off, contacts TME1 are closed and contacts TME2 are open. When the interval has been timed out, the clutch and motor are both off, contacts TME1 are open and contacts TME2 are closed.

Operation is as follows:

The operation of the apparatus is hereinafter described in reference to the introduction into the apparatus, the exposure and the discharge of a single-page plate P. The operator turns on switch 583 (i.e., closes it), and actuates the START switch 589 with the result that relay R9 is energized via line 595 to close its contacts R9*a*, *c* and *d*. Closure of contacts R9*a* provides power to the light source; closure of contacts 9*c* provides a holding circuit 593 around switch 589; and closure of contacts 9*d* energizes relays R6 and R5 via lines 613 and 615 (switches 521 and 433 being closed) to close their contacts R6*a* and R5*a* and energize the vacuum pump and air compressor motors 507 and 313. After a warm-up period, and a visual check-up to be certain that all components are in their proper position, the operator sets switch 617 on AUTOMATIC (i.e., closes it). He then turns the rotary switch 606 to the position where its *a* contacts are closed (and its *b* and *c* contacts are open). The feed table 207 is in its retracted position at this time, so that limit switch FTA is held with its contacts FTA1 and 2 closed and its contacts FTA3 open. With contacts FTA1 closed solenoid valve 439 is energized to supply compressed air to the air cylinders 223 for the single-page plate and negative registration pins RP1 and FP1 to raise these pins.

One of the clamp carrier bars 53 will be disposed at the input station I, with a second of the bars 53 forward at station D and the third of the bars 53 down in the return reach of the chain conveyor 5 (see FIG. 3). The window 101 will be in its raised position of FIG. 3. The piston rod 243 of cylinder 239 is in its retracted position (FIG. 9) and the clamps C carried by the bar 53 at station I are closed. The piston rod 355 of cylinder 351 is retracted as a result of solenoid 487 of valve 479 being energized and the pinch roll 339 is up in its FIG. 3 retracted position. The vacuum cup lift bar 273 is in its home position of FIGS. 3 and 17. Assuming that more than one plate is to be exposed through the negative F, switch 689 is turned to close its lower contacts *a* for setting the belt conveyor 309 in its raised position to deliver the negative back to the upper tray 271U after exposure, with resultant subsequent energization (as will appear) of the latching coil of relay R21 to close contacts R21*a* and open contacts R21*b*, thereby energizing the UP solenoid 497 of valve 491 to extend the piston rod 389 of cylinder 385 and raise the rearward end of the belt conveyor 309 (its left end as viewed in FIG. 3). It will be apparent that if conveyor 309 is to be set in its lowered position to deliver a negative back to the lower tray 271L, switch 689 is turned to close its lower contacts *b* and open its upper contacts *a*, thereby energizing the unlatching coil of relay R21 to open contacts R21*a* and close contacts R21*b*, and thereby energizing the DOWN solenoid 499 of valve 491 for retraction of the piston rod 389 and lowering of the conveyor 309 to its position for delivery of the negative to the lower tray 271L.

Figure 9:
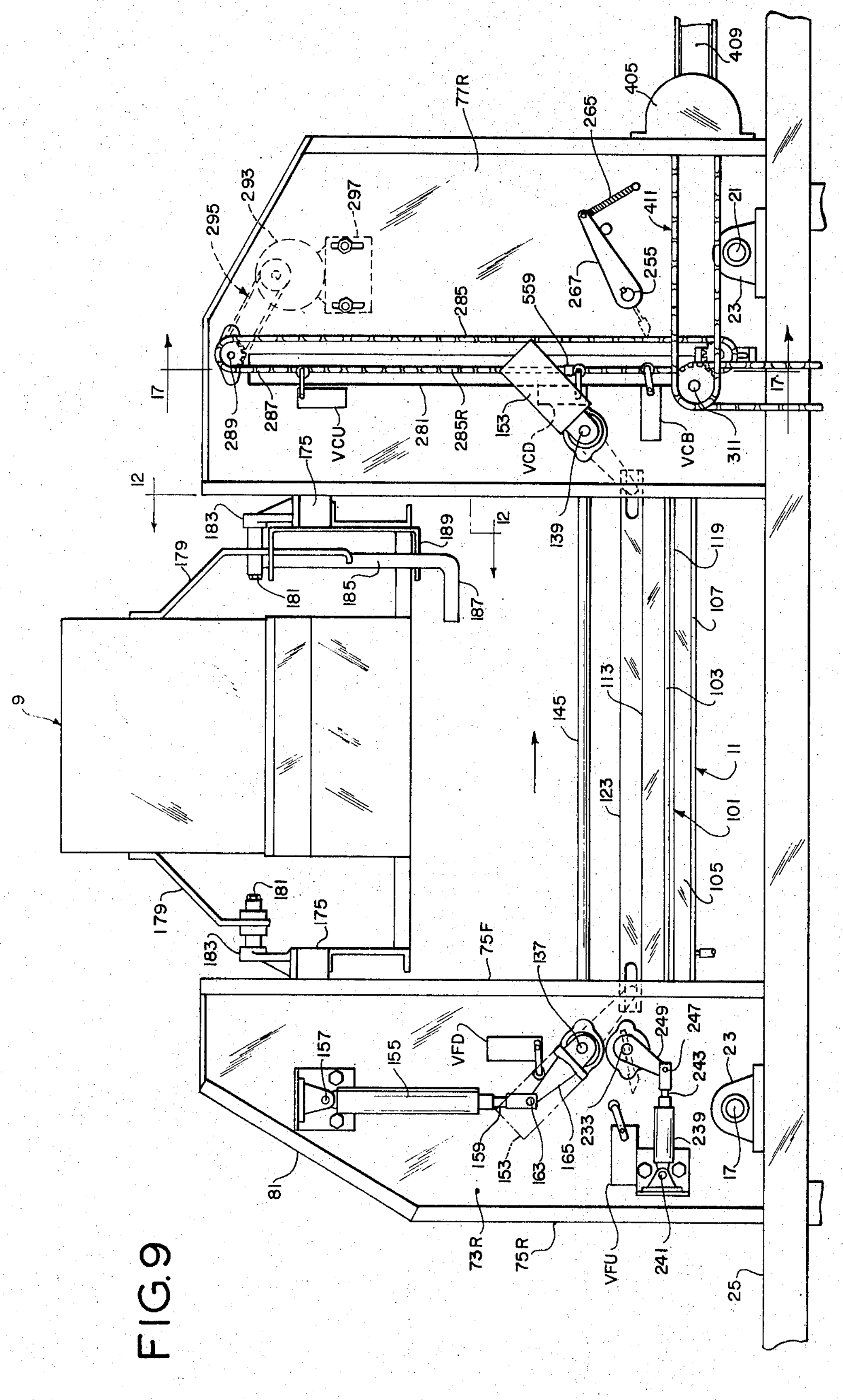
FIG. 9 is a right side elevation of the upper part of the apparatus on a larger scale than FIG. 2, with certain closure panels removed.
Figure 10:
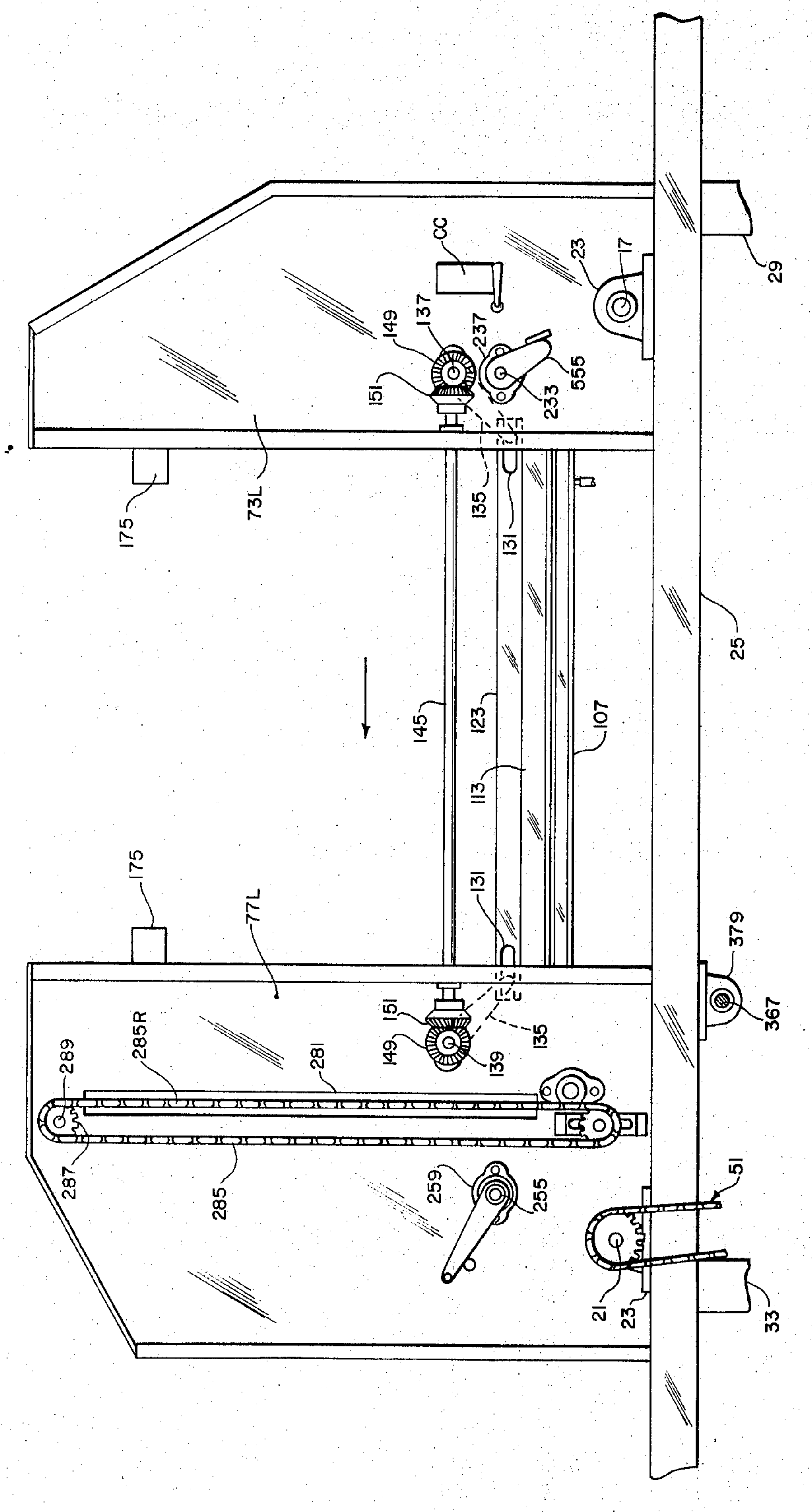
FIG. 10 is a left side elevation of the upper part of the apparatus, with certain closure panels removed, and other parts omitted.

The operator lays the single-page plate P on the cover panel 193 with the pins RP1 and FP1 (raised to extend upward above 193) entered in the registration holes in the plate P. Then he lays the negative F on the plate P with the pins entered in the registration holes in the negative for registration of the negative with the plate. Having thus registered the plate and the negative, the operator actuates (closes) the "Feed Table Loaded" switch 603. The immediate result of this is to energize relay R13 via line 601, closing its contacts R13*a* to provide a holding circuit to hold it energized, and closing its contacts R13*b* to energize solenoid valve 501 to retract piston rod 243 of cylinder 239 (FIG. 9)

and open the clamps C at station I. Contacts RP1 in line 621 are closed at this time, via actuation of limit switch RP by the bar 53 at station D. When the clamps open, limit switch CC is released and its contacts CC1 and 2 close and its contacts CC3 open. On closure of contacts CC1, contacts FTA1 are by-passed. On closure of contacts CC2, solenoid 463 of valve 455 is energized to retract the piston rod 213 of cylinder 209 and thereby advance the feed table 207.

The feed table 207 moves forward, with pins RP1 and FP1 raised, carrying forward the plate P and the negative F registered on the plate and entering the forward end margins of the plate and negative in the opened clamps C. As the plate P moves forward, it slides off the cover panel 193 and rests on the table 207. The rearward ends of the lower clamp jaws 57 enter underneath the plate P via the recesses 229 in the bar 225 at the forward end of the feed table 207. When the feed table 207 reaches its fully advanced position, it actuates the limit switch FTR, closing its contacts FTR1. On closure of these contacts, time delay relay R12 is energized via line 629 and after a time delay interval, its contacts R12*a* open to deenergize relay R13. This results in opening of contacts R13*b* in line 621 to deenergize solenoid valve 501 to retract piston rod 243 of cylinder 239 to close the clamps C at station I, thereby gripping the leading margin of the plate P and negative F in the clamps at station I.

When the clamps C at station I are closed (i.e. when piston rod 243 has been fully retracted to raise the arms 235 to allow the clamps to close), limit switch CC is actuated and its contacts CC1 and 2 open and its contacts CC3 close. When contacts CC1 open, solenoid 439 is deenergized, and the springs in air cylinders 233 for pins RP1 and FP1 retract these pins downward. Relay R15 in line 625 is energized via contacts CC3 and contacts FTR1 (which are closed at this time). After a time delay (giving the pins ample time to lower), contacts R15*a* of relay R15 close to energize the latching coil of relay R10 in line 627. This results in closure of contacts R10*a* in line 585 to energize relay R11. This results in closure of contacts R11*b* in line 675. With contacts R16*d*, EP1 and VFU1 closed at this time, relay R7 is energized to close contacts R7*a* in the chain conveyor motor circuit 576 and start the chain conveyor motor 49.

The motor 49 drives the chains 13 of chain conveyor 5 via the chain and sprocket drive 51 to move the bar 53 carrying clamps C gripping the plate P and negative F forward along the horizontal path of the upper reach of the conveyor, dragging plate P with the negative thereon over the blanket 105. The motor 49 is maintained in operation to index the bar 53 to the exposure station E, at which point the plate and negative are in exposure position on blanket 105 under the window 101. When the bar 53 approaches station E, it actuates limit switch EP to open its contacts EP1 in line 675 and close its contacts EP2 in line 679. Opening of contacts EP1 deenergizes relay R7 to open contacts R7*a* and deenergize the motor 49, stopping it with the bar 53 at station E. Closing of contacts EP2 energizes solenoid 461 of valve 455 to extend the piston rod 213 of cylinder 209 and thereby retract the feed table 207.

When the feed table 207 returns to its retracted position, it actuates limit switch FTA to close its contacts FTA1 and 2 and open its contacts FTA3. Opening of contacts FTA3 deenergizes solenoid 461 to stop the feed table in retracted position. Closing of contacts FTA1 energizes solenoid valve 439 to raise the pins RP1 and FP1 in readiness for the next cycle.

Closing of contacts EP2 in line 679 also energizes solenoid 475 of valve 467 to retract piston rod 159 of cylinder 155 and lower the window 101. This is via contacts R10*b* (closed at this time via energization of relay R10), closed contacts 681*a* and closed contacts VFD1 of limit switch VFD. During the interval in which the window 101 is being lowered, the latching coil of relay R21 in line 691 is energized to lift the belt conveyor 309 to its raised position. Also during the interval in which the window is being lowered, contacts 606*c*, if closed, would permit energization of the latching coil of relay R19 for drawing vacuum in the left-hand vacuum cups 275L but, since contacts 606*c* are open for handling a single-page plate and negative via the pins RP1 and FP1 on the right of the apparatus, R19 remains unenergized, and hence the left-hand vacuum cups 275L remain off.

When the window 101 is fully lowered, limit switch VFD is actuated to open its contacts VFD1 and close its contacts VFD2. Opening of contacts VFD1 deenergizes the relay 475 and the window 101 dwells in its down position overlying the plate P and negative F in the exposure position on the blanket 105, with the sealing strip 119 engaging the margin of the blanket all around the plate and negative with a substantially air tight seal. Closure of contacts VFD2 in line 697 energizes solenoid 549 of valve 543 to connect fitting 167 via line 171 to vacuum line 517 thereby to draw a vacuum in the space immediately above the blanket 105 bounded on the top by the transparent window panel 103 and around on all four sides of the plate P and negative by the sealing strip 119. As a result, the blanket 105 is forced up by atmospheric air pressure (via holes 107*o* in plate 107) to press the plate and negative upward against the transparent panel 105 for smoothing purposes.

When solenoid 549 is energized, relay R17 in line 699 is energized. Contacts R17*a* of relay R17 immediately open, and after a time delay interval sufficient to insure smoothing out of the negative, contacts R17*b* close. This energizes lamp 703 to indicate that the plate P and negative are ready for inspection, if desired, to be certain that they are properly registered and that the negative is smooth. If such inspection is desired, the switch 701 is set in its "Hold for Inspection" position (i.e., its *a* contacts closed and its *b* contacts open). If inspection is not desired, it is set in position with its *a* contacts open and its *b* contacts closed. If the setting is on Hold for Inspection, the inspection release switch 710 is actuated to resume operation after the inspection has been carried out. This result of this is to energize the exposure timer motor TME and the relay R8, closing contacts R8*a*, R8*b* and R8*d*, and opening R8*c*. On closure of R8*a*, the power to the lamp of the light source is increased to the exposure value and the shutter of the light source is opened to start the exposure of the plate P through the negative F thereon.

The length of time of the exposure is controlled by presetting the time interval of the timer TME (which may be adjustable up to sixty seconds, for example). When the timer motor has timed out this interval, the timer contacts TME1 in line 707 are opened, deenergizing the timer motor and the relay R8. Timer contacts TME2 in line 725 close to energize the latching coil of relay R16 and the unlatching coil of relay R10. The unlatching of relay R10 closes contacts R10*c* in line 719, thereby energizing relay R22, and solenoid 547 of valve 543. The latter vents the vacuum window or frame 101. Relay R22, after a time delay to allow this venting, closes contacts R22*a* in line 723 thereby energizing solenoid 473 of valve 467 to extend the piston rod 159 and raise the window 101. Energization of the latching coil of relay R16 closes contacts R16*c* in line 661 with resultant energization of the timer reset clutch 671 to reset the timer to zero for the next cycle. On energization of the unlatching coil of relay R10 in line 727, contacts R10*a* in line 585 open to deenergize relay R11, and contacts R11*b* in line 675 close.

When window 101 is fully raised, it actuates limit switch VFU to close contacts VFU1 in line 674 and to open contacts VFU2 in line 717. The closure of contacts VFU1 in line 674 energizes relay R7 via R11*a*, VCD3, PRU2 and RP2 to close contacts R7*a* and restart the chain conveyor motor 49 to drive the chain conveyor 5. With the window 101 raised, the bar 53 carrying the exposed plate P and negative F thereon is indexed forward from station E, and when it reaches station D and has actuated limit switch RP it stops, actuation of limit switch RP resulting in opening of its contacts RP2 in line 674 to deenergize R7 and motor 49, and closing of contacts RP1 in line 621. On closure of contacts RP1, relay R1 is energized through contacts RP1, PRU1, R16*a* and VCB1 to close contacts R1*a* and thereby energize motor 293 to drive chains 285 in the direction to lower the vacuum cup bar 273.

Figure 17:
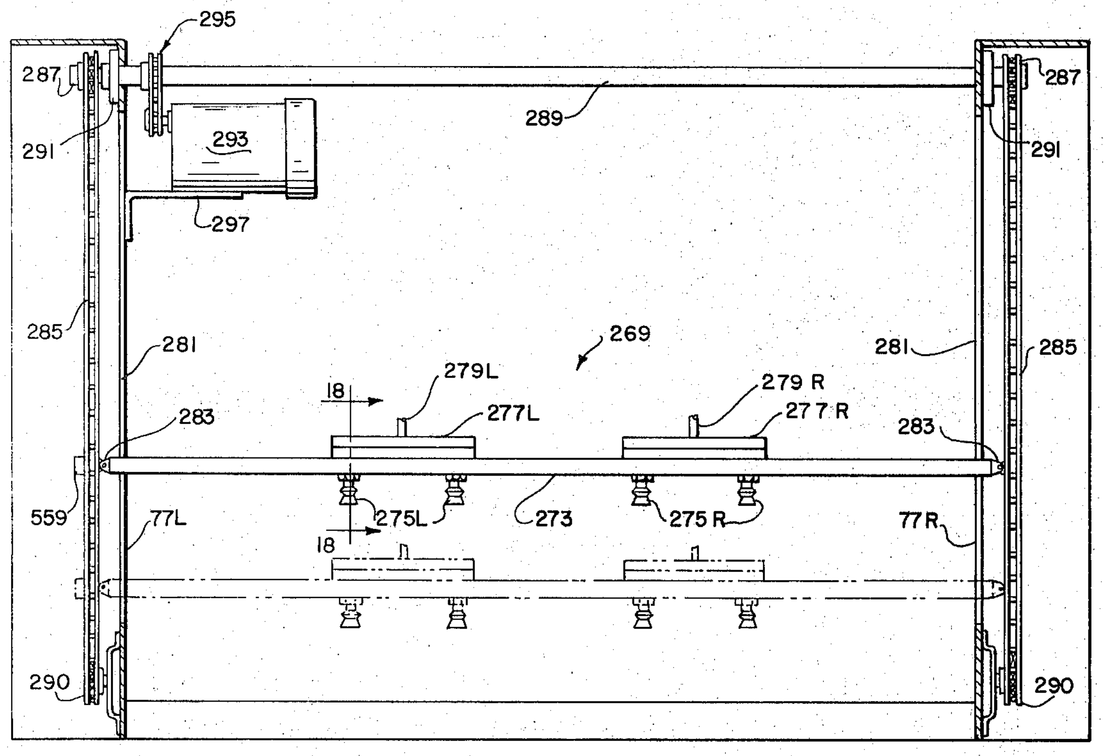
FIG. 17 is a vertical transverse section generally on line 17—17 of FIG. 9, with parts omitted.
Figure 18:
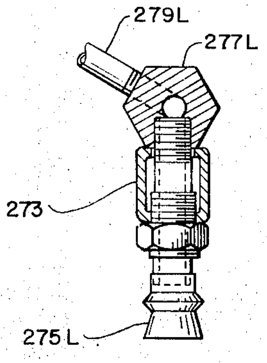
FIG. 18 is an enlarged detail section on line 18—18 of FIG. 17.

The vacuum cup lift bar 273 is driven downward from its home position of FIG. 17 to the point where the vacuum cups 275R contact the negative F at station D adjacent the leading edge of the negative. At this point, limit switch VCB is actuated, thereby opening its contacts VCB1 and VCB3 and closing its contacts VCB2. On opening of contacts VCB1 (in line 631), relay R1 is deenergized to open contacts R1*a* to stop the downward movement of the vacuum cup lift bar 273. On closing of contacts VCB2 (in line 651), solenoid 541 of valve 533 is energized to connect the right-hand vacuum cups 275R to the vacuum line 517 to draw a vacuum in these cups. Also on closing of contacts VCB2, relay R14 is permitted to energize, provided either that contacts FTA2 are closed (i.e., feed table 207 is retracted) or contacts R11*a* are closed (relay R11 energized). Assuming either of these conditions, relay R14 is energized via contacts CP1(normally closed).

On energization of relay R14, its contacts R14*a* in line 621 open its contacts R14*b* in line 677 close. On closure of contacts R14*b*, relay R7 is energized via VFU1 (closed) in line 674 to close contacts R7*a* to energize the chain drive motor 49 thereby to drive the chain conveyor 5 and index the bar 53 forward from station D and around to the clear position O, at which point bar 43 actuates limit switch CP to open its contacts CP1 and close its contacts CP2. It will be recalled that clamps C carried by the bar 53 at station D are opened via engagement of the bar with the follower roller on arm 261 on the rock shaft 255, so that the plate and negative remain behind at station D when the bar 53 is indexed around to position O. Opening of contacts CP1 (in line 655) deenergizes relay R14, closing contacts R14*a* in line 621 and opening contacts R14*b* in line 677. On opening of contacts R14*b*, relay R7 is deenergized and motor 49 stops with the bar 53 at position O. On closure of contacts CP2 (line 661), relay R2 is energized to close contacts R2*a* thereby to energize motor 293 to drive chains 285 in the direction to lift the vacuum cup bar 273. This continues to lift the bar 273 up to the upper limot of its stroke. With vacuum on in the right-hand vacuum cups, the negative F is thereby lifted up away from the plate P at station D to the position shown in FIG. 11, hanging down from the cups 275R on the lifted bar 273. The latter stops in its lifted position via actuation of limit switch VCU with resultant opening of contacts VCU1 in line 661 to deenergize relay R2 and hence to deenergize motor 293.

on the lifting of the bar 273 from its bottomed position, limit switch VCB is released, and its normally closed contacts VCB3 in line 663 re-close. This energizes solenoid 485 of valve 479 to extend piston rod 355 of cylinder 351 to lower the pinch roll 339. When the pinch roll reaches its lowered position, in which it pinches the exposed plate P at station D against the drive roll, limit switch PRD is actuated, closing its contacts PRD1 in line 633. With the interlock contacts 641 in line 643 closed, relay R3 is energized to close contacts R3*a* and energize the motor 313 for driving roll 303 and roll 325 to feed the exposed plate P forward to the discharge conveyor 7, which is also driven by motor 313. Conveyor 7 is adapted to feed the exposed plate directly and in line into a plate processing machine. Relay 18 in line 645 is energized when relay R3 is energized. After a time delay, relay 18 closes its contacts R18*a* in line 649 and energizes the unlatching coil of relay R16. This closes contacts R16*d* in line 675. The result of this is that, if contacts R11*b* are closed (indicating that the next plate and negative have been clamped and are ready for exposure), relay R7 is energized to start the chain conveyor motor 49 to drive the chain conveyor 5 to index the plate and negative to the exposure position (as determined by limit switch EP). Unlatching of relay R16 also closes contacts R16*b* in line 633. The result of this is to energize relay R1 through PRD1, VCD1, R16*b* and VCB1. Contacts R1*a* close and energize motor 293 to drive chains 285 in the direction to lower the vacuum lift bar 273. This bar is lowered to its home position, as determined by its actuation of limit switch VCD to open contacts VCD1 and close VCD2 and VCD3. On opening of contacts VCD1 (line 633), relay R1 is deenergized, stopping the motor 293. On closing of contacts VCD2 (line 635), the vacuum off solenoid 539 for the right-hand vacuum cups 275R is energized (also the vacuum off solenoid 529 for the left-hand vacuum cups 275L) to cut off the vacuum in the cups. Also, solenoid 487 of valve 479 is energized to retract the piston rod 355 and raise the pinch roll 339. When the vacuum in the cups is cut off, the negative F which was held by the cups is released, and it drops down through the chute 305 to the belt conveyor 309, which feeds it to the upper tray 271U.

When the pinch roll 339 reaches its raised retracted position, limit switch PRU is actuated, closing contacts PRU1 (line 631) and PRU2 (line 673). If another plate and negative were not clamped to the conveyor 5 during the discharge phase, closure of PRU2 effects energization of relay R7 to operate the chain conveyor drive motor 49 to drive the chain conveyor 5 to index a bar 53 to station I (and the next leading bar to station D). Actuation of limit switch RP by a bar stops the conveyor with the bars 53 at stations I and D, and the apparatus is then in readiness for a repetition of the cycle as above described.

Figure 24:
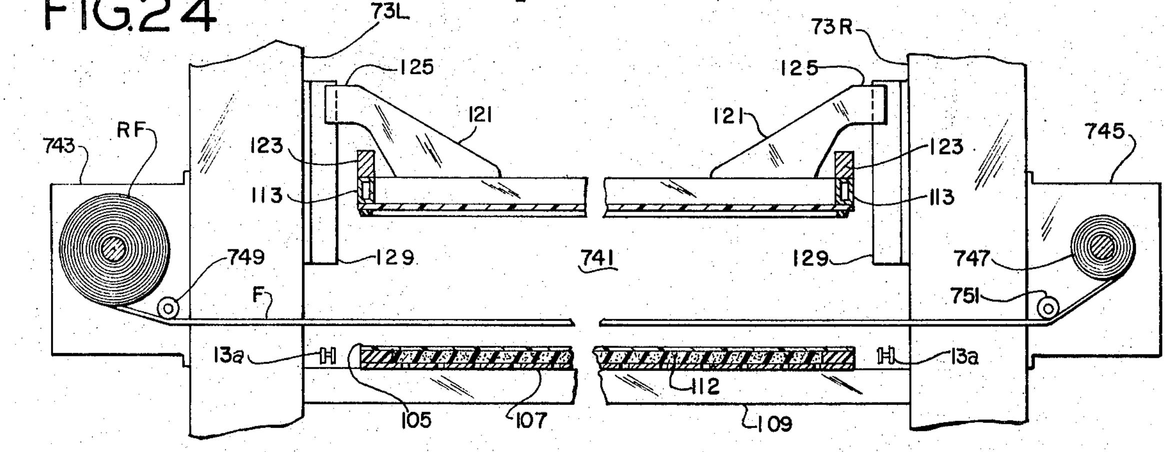
FIG. 24 (sheet 10) is a view similar to FIG. 8 but with a window open (raised), and showing a modification.

It will be observed that with the arrangement for lifting and lowering the window 101 via the arms 135, there is a clear space at 741 (see FIG. 3) between the window 101 and the blanket 105 generally from the vertical transverse plane of the apparatus through the forward flanges 75F of the rear side plates 73L and R to the vertical transverse plane of the apparatus through the rearward flanges 79R of the forward side plates 77L and R. This enables modification of the apparatus as shown in FIG. 24 to handle roll film as well as or in lieu of individual negatives. As shown in FIG. 24, the doors 93 are omitted. A holder 743 for a roll RF of film F having individual frames to be exposed is mounted on one side of the apparatus, for example its left side, extending lengthwise of the apparatus between the left side plates 73L and 77L, and a holder 745 for a take-up spindle 747 for taking up the film from roll RF is mounted on the other side of the apparatus, for example the right side, extending parallel to 743 between the right side plates 73R and 77R. The the first position shown in FIG. 26 with the mirror 815 above in position for projection of an image by projector 805 on to a plate P at position EP and with light source 9 retracted off to one side (the left side as viewed in FIG. 26), and the second position shown in FIG. 27 with the light source 9 above EP in position for contact exposure of a plate P at EP and with mirror 815 retracted off to one side (the right side as viewed in FIG. 27). The carriage 817 is movable back and forth between its stated first and second positions via a pair of screws 819 extending crosswise of the apparatus through and threaded in ball screw bushings 820 in side frame members 821 of the carriage. The screws 819 are journalled at their ends in outboard supports 823 spanning the outer ends of plates 825 projecting laterally outwardly from the rearward and forward side plates 73L and 73R and 77L and 77R. The screws are adapted to be driven in one direction or the other by a motor 827 via a drive 829 to a shaft 831 carrying worms such as indicated at 833 in mesh with worm gears such as indicated at 835 on the screws.

Figures 28, 29:
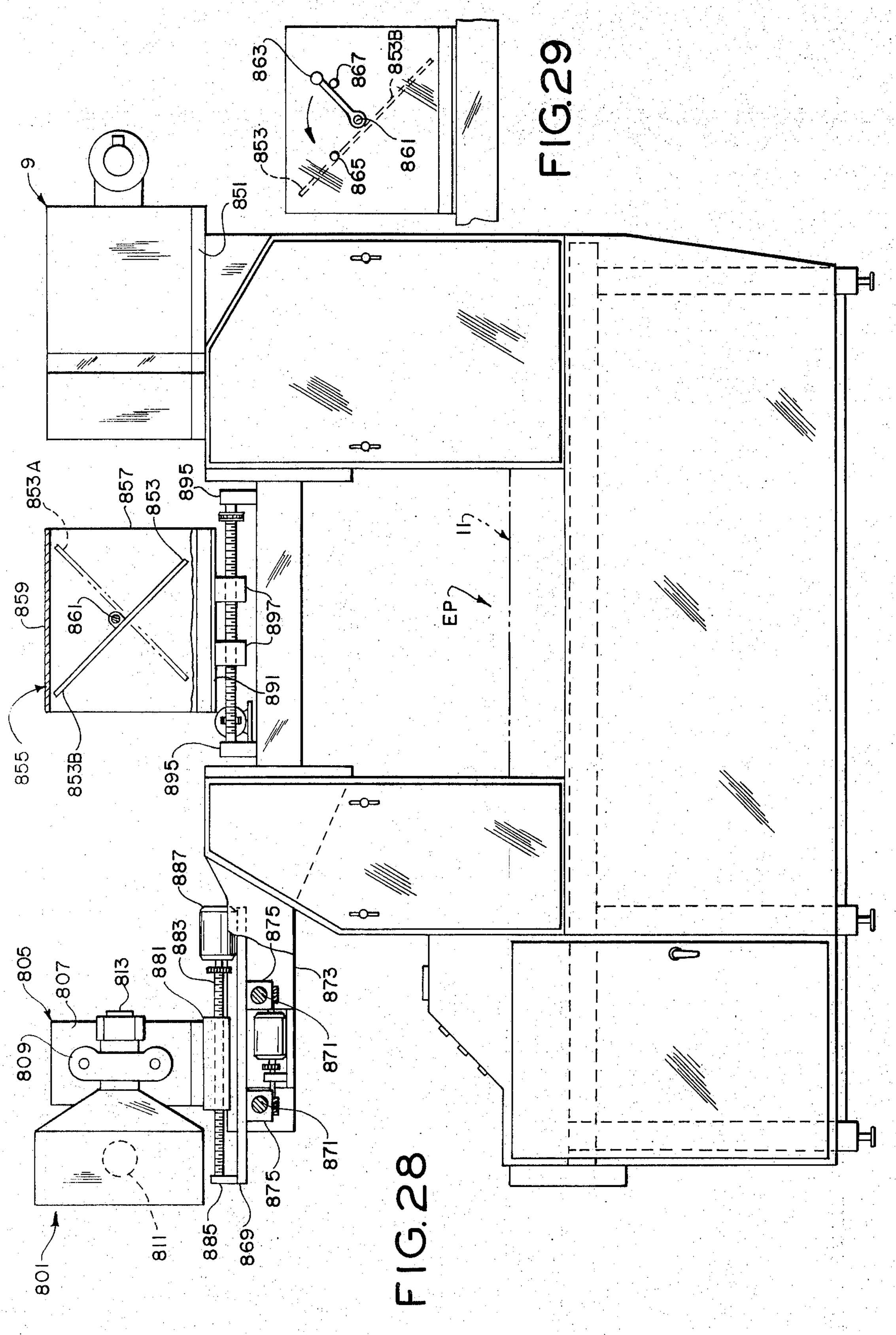
FIG. 28 is a view similar to FIG. 25 illustrating a further modification, with parts broken away.
FIG. 29 is a detail of the FIG. 28 modification.
Figure 30:
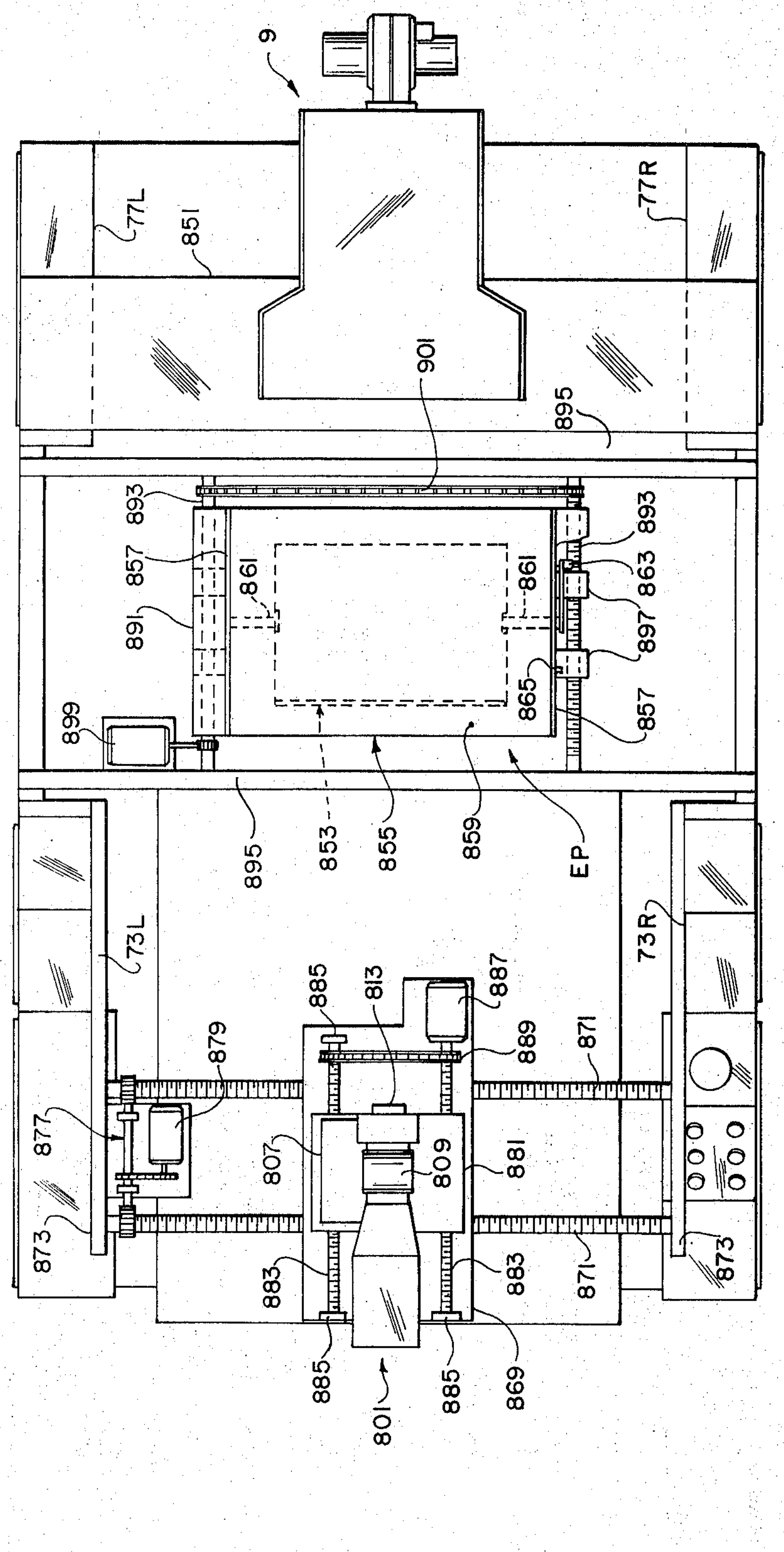
FIG. 30 is a plan of FIG. 28.

As illustrated, the mirror 815 is mounted at an angle 77L and 77R, oriented to direct its light rearward (i.e., toward the left as viewed in FIGS. 28 and 30). The mirror, here designated 853, is mounted in a hood 855 having sides 857 and a top 859, but open at its front (on the right in FIGS. 28 and 30) and at its rear (on the left in FIGS. 28 and 30) and also at its bottom. This hood and the mirror are centered transversely of the apparatus with respect to exposure position EP. Light source 9 is also centered transversely of the apparatus, and both the mirror and source 9 remain so centered. The mirror is pivoted for swinging movement about a horizontal axis extending transversely with respect to the apparatus by means of trunnions 861 journalled in the sides 857 of the hood, being swingable between a 45° contact exposure position indicated at 853A in FIG. 28 for reflecting light from light source 9 down toward exposure position EP and an opposite 45° projection exposure position indicated at 853B in FIGS. 28 and 29 for reflecting the image beamed from projector 801 down toward EP. As illustrated in FIG. 29 one of the trunnions has a crank 863 on its outer end (see FIG. 29) for swinging the mirror between its two positions, which are determined by engagement of the crank alternatively with stops 865 and 867. With this arrangement, the mirror 853 is turned to position 853A for operation in the contact exposure mode and to position 853B for operation in the projection exposure mode.

Also as shown in FIGS. 28 and 30, means is provided whereby the projector 801 is movable for projection exposure of a plurality of images upon one or more lithographic plates at exposure position EP, i.e., for projection of images from film in the projector on to different areas of a plate or on to different plates at EP. This means comprises a main projector carriage 869 movable transversely of the apparatus on a pair of screws 871 extending horizontally and transversely of the apparatus at its upper rear between bearing brackets 873 extending rearward from rear side plates 73L and 73R at the upper ends of the latter. These screws extend through and are threaded in ball screw bushings in blocks 875 on the bottom of carriage 869, and are adapted to be driven in one direction or the other via a drive such as indicated at 877 from a motor 879. The projector 805 is mounted on an auxiliary carriage 881 movable longitudinally of the apparatus on a pair of screws 883 journalled in bearings 885 on the carriage 869. These screws 883 extend through and are threaded in ball screw bushings in the sides of the carriage 881 and are adapted to be driven in one direction or the other by a motor 887, with a drive such as indicated at 889 interconnecting the screws. Means is also provided whereby the mirror 853 may be moved forward and rearward to different positions of adjustment, comprising a carriage 891 carrying the mirror movable longitudinally of the apparatus on a pair of screws 893 extending longitudinally of the apparatus above exposure position EP journalled in bars such as indicated at 895 extending transversely of the apparatus. These screws extend through and are threaded in ball screw bushings in blocks 897 at the sides of the carriage, and are adapted to be driven in one direction or the other by a motor 899 with a drive such as indicated at 901 interconnecting the screws.

The main projector carriage is movable to different positions of adjustment laterally in respect to the mirror 853 and a plate P at exposure position EP for projection of images from the film in the projector 805 on to side-by-side areas of the plate, or on to two plates side-by-side at EP, and the auxiliary projector carriage 881 is movable to different positions of adjustment longitudinally of the apparatus for projection of images from the film in the projector on to areas of a plate which are displaced longitudinally of the apparatus (heightwise of the plate). The mirror is movable to different positions of adjustment longitudinally of the apparatus as may be required for different longitudinal positions of adjustment of the projector.

Figure 25:
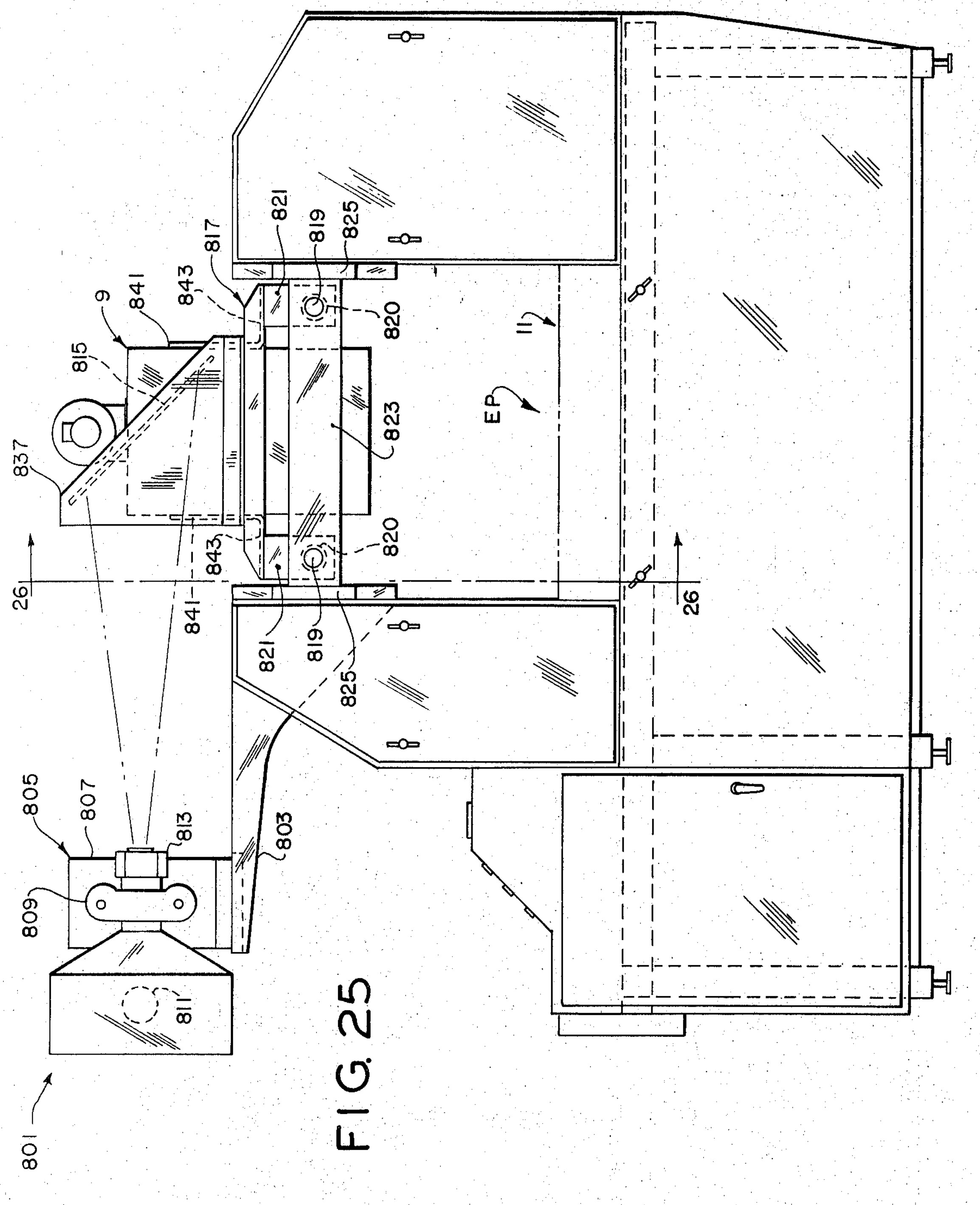
FIG. 25 is a view similar to FIG. 2 showing another modification.
Figure 26:
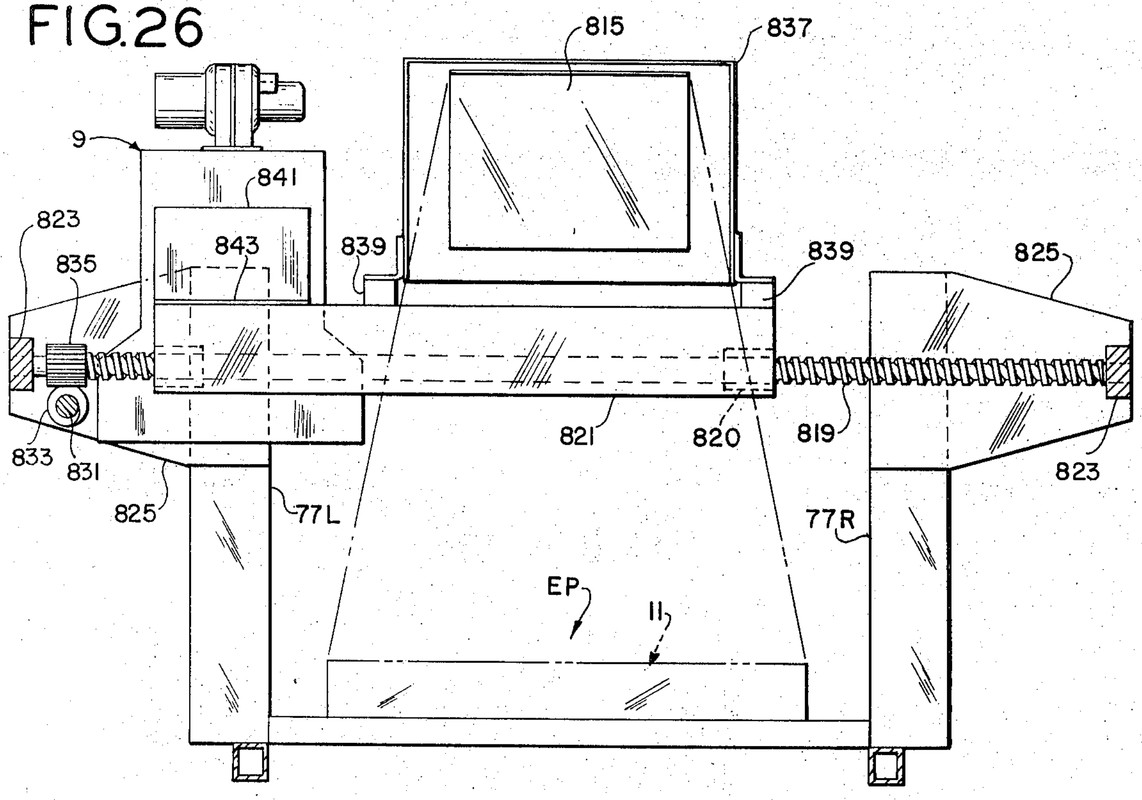
FIG. 26 is a vertical transverse section on line 26—26 of FIG. 25, showing certain parts in a first position.
Figure 27:
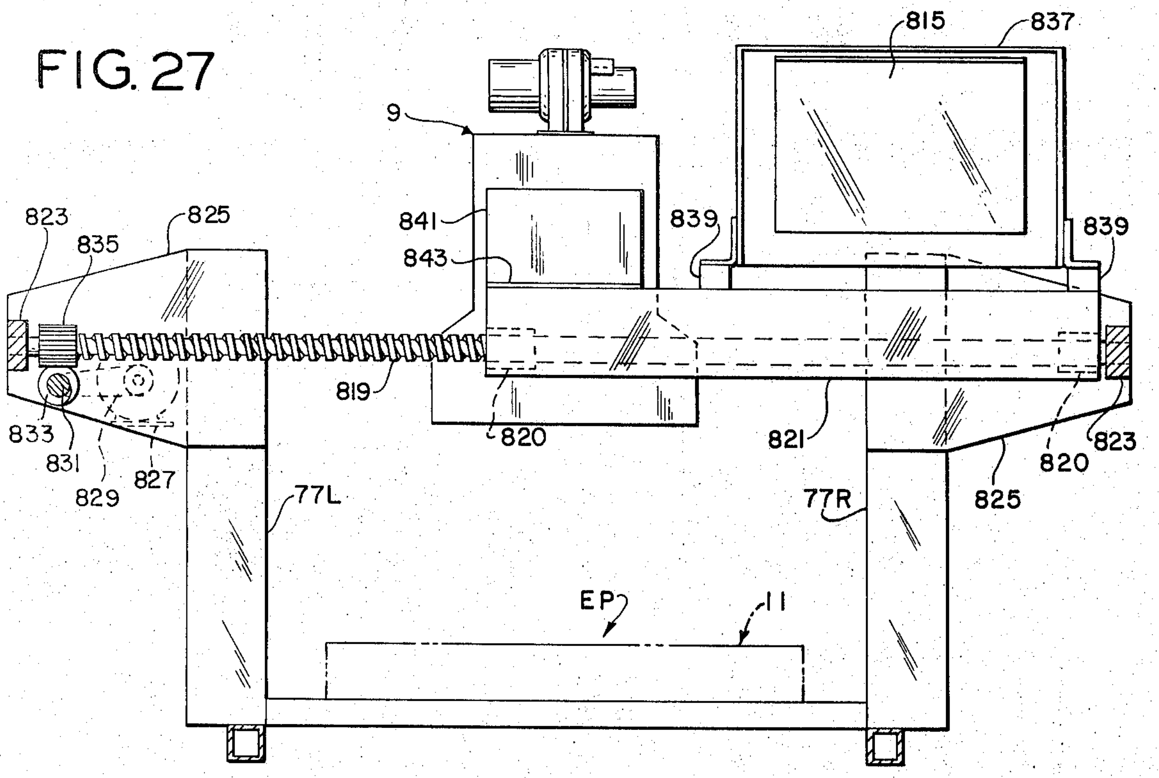
FIG. 27 is a view similar to FIG. 26 showing the said parts in a second position.

It will be understood that the swinging mirror feature may be used with a stationary projector, and that the movable projector feature may be used in conjunction with the feature of having the mirror and light source 9 movable as in FIGS. 25–27.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. Apparatus for exposing photosensitized plates comprising a conveyor having plate gripping means spaced at intervals along its length each adapted releasably to grip a plate for movement of the plate by the conveyor in a forward direction along a predetermined path, means for intermittently operating the conveyor to index each plate gripping means from a first station for application of a plate thereto to a second station along said path for bringing the gripped plate to an exposure position and thence to a third station farther along said path for discharge of the plate, a light source for exposing the plate in exposure position to light through a film after the plate gripping means has been indexed to the second station, means at the third station for releasing the plate gripping means, and means at the third station operable upon release of the plate gripping means for feeding the released plate forwardly out of the apparatus for further processing.

2. Apparatus as set forth in claim 1 wherein each of said gripping means is adapted to grip a film on a plate, and wherein said apparatus has means for registering the film with the plate.

3. Apparatus as set forth in claim 2 wherein each of said gripping means comprises a set of clamps for clamping a plate with a film thereon at the forward end of the plate and film.

4. Apparatus as set forth in claim 3 having means at the first station for opening the clamps, and means for effecting registration of a film on a plate and feeding the plate and film for entry of their forward ends in the opened clamps at the first station, the clamps then closing to grip the plate and film.

5. Apparatus as set forth in claim 4 wherein said registration and feeding means comprises a table movable away from a retracted position spaced from said first station forward toward said first station and then back to said retracted position, and means carried by the table for effecting registration of a film on a plate applied to the table.

6. Apparatus as set forth in claim 5 wherein said means carried by the table comprises a plurality of registration pins movable up and down between a raised position extending up above the top surface of said table for entry in holes in a plate and a film and a lowered retracted position below said top surface.

7. Apparatus as set forth in claim 6 for exposing one or two single-page newspaper lithographic plates or a double-page newspaper lithographic plate having a first rearward pin and a first forward pin for registering one single-page plate and negative, a second rearward pin and a second forward pin for registering a second single-page plate and negative, and third and fourth rearward pins and third and fourth forward pins for registering a double-page plate and negative.

8. Apparatus as set forth in claim 1 having means for pressing a plate and a film when brought to the exposure position, said first station being rearward of and said third station being forward of said pressing means, said pressing means being adapted to be opened for indexing of the plate gripping means.

9. Apparatus as set forth in claim 8 wherein said pressing means comprises a window movable downwardly from a raised retracted position toward a pressing position with respect to a plate and film, and means at the ends of the window for raising and lowering said window.

10. Apparatus as set forth in claim 1 wherein said feeding means comprises a feed roll engageable by the plate when the plate gripping means moves to the third station, and means for driving the feed roll to feed the released plate forward.

11. Apparatus as set forth in claim 10 having a pinch roll movable from a retracted position toward the feed roll to pinch the plate between the rolls.

12. Apparatus as set forth in claim 1 wherein each of said gripping means is adapted to grip a film on the plate, and having means for picking up the film off the plate after the plate has been exposed and the exposed plate and film have moved forward with the gripping means when the latter moves forward to the third station, and is released.

13. Apparatus as set forth in claim 12 wherein said pick-up means is a vacuum cup means movable downwardly to grip the film by vacuum and upwardly to lift the film from the plate, said vacuum cup means, on release of vacuum, releasing the film to drop down through a space rearward of the third station.

14. Apparatus as set forth in claim 13 having means for pressing a plate and a film when brought to the exposure position, said first station being rearward of and said third station being forward of said pressing means, said pressing means being adapted to be opened for indexing of the plate gripping means, said space being between the forward end of said pressing means and said third station.

15. Apparatus as set forth in claim 14 having a film conveyor below said pressing means for receiving the film dropping down through said space and conveying it out from under said pressing means.

16. Apparatus as set forth in claim 15 wherein the film conveyor returns the film to the entrance end of the apparatus.

17. Apparatus as set forth in claim 16 wherein the film conveyor is movable to set it in a first position for delivering a film to a first tray or in a second position for delivering the film to a second tray.

18. Apparatus as set forth in claim 1 wherein said conveyor comprises a pair of endless chains, and each plate gripping means comprises a bar extending between the chains having a set of clamps on the trailing side thereof for clamping a plate, and said releasing means at the third station comprises means for opening the clamps.

19. Apparatus as set forth in claim 18 having means at said exposure position carrying a flexible blanket, the chains having an upper reach in which they carry the bars over the blanket, and further having a window movable downwardly from a raised retracted position toward the blanket, means for effecting a seal between the window and blanket all around a plate and a film on the blanket in exposure position when the window is moved down, and means for evacuating the space between the blanket and the window when the window is moved down, and wherein said first station is rearward of said window and said second station is forward of said window.

20. Apparatus as set forth in claim 19 wherein said plate feeding means comprises a feed roll rotatable in the direction to feed the released plate forward, and having means for operating the conveyor to index a bar forward and around from the upper reach of the chains to a clearance position for clearing the plate to be fed forward by said roll.

21. Apparatus as set forth in claim 20 having a pinch roll movable from a retracted position toward the feed roll to pinch the plate between the rolls, and a discharge conveyor at the forward end of the apparatus for receiving the discharged plate from the feed and pinch roll and conveying it forward away from the apparatus.

22. Apparatus as set forth in claim 20 wherein each set of clamps is adapted to grip a film and a plate, said apparatus further having vacuum cup means for picking up the film off the plate after the plate has been exposed and the exposed plate and film moved forward with a bar when it moves forward to the third station and the clamps are opened.

23. Apparatus as set forth in claim 22 having a space between the forward end of the blanket and the feed roll, and wherein the vacuum cup means is adapted to release the film to drop down through said space.

24. Apparatus as set forth in claim 23 having means for opening the clamps on a bar at the first station, a registration and feed table movable away from a retracted position spaced from the clamps of the bar at the first station toward said clamps to enter a plate and a film in the opened clamps, said clamps thereupon closing, and means carried by the table for effecting registration of a film on a plate applied to the table.

25. Apparatus for exposing photosensitized plates comprising an endless conveyor movable intermittently to convey a plate through a predetermined path from a first position at which the plate is applied to the conveyor to a second exposure position along said path for exposure of the plate and thence to a third position farther along said path, means for feeding a film laterally across the apparatus from one side thereof to the other over the plate in the exposure position, and a light source for exposing the plate in the exposure position to light through the film.

26. Apparatus for exposing photosensitized plates comprising conveyor means movable intermittently to convey a plate through a predetermined path from a first position at which the plate is applied to the conveyor means to a second position along said path constituting an exposure position and to convey an exposed plate away from said exposure position, means for pressing the plate at the exposure position adapted to be opened to permit the conveyor means to move a plate from the first position to the exposure position and to move an exposed plate away from the exposure position, and adapted to be closed for pressing a plate at the exposure position for exposure of the plate while the conveyor means is stopped, said pressing means including a light-transmitting panel engageable with the face of the plate to be exposed, and means for projecting an enlarged image from a film through said panel on to the said face of a plate pressed for exposure by said pressing means at said exposure position.

27. Apparatus as set forth in claim 26 wherein said projecting means includes a film projector and a mirror for reflection of the image from film in the projector on to the said face of a plate at the exposure position.

28. Apparatus as set forth in claim 26 having a first light source for contact exposure of a plate at the exposure position through a film in contact with the plate, said projecting means including a second light source for directing light through a film therein.

29. Apparatus as set forth in claim 27 wherein said projecting means includes a film projector and a mirror for reflection of the image from the film in the projector on to said face of said plate at the exposure position, the second light source being in the projector.

30. Apparatus as set forth in claim 29 wherein said first light source and said mirror are mounted on a common support movable between a first position wherein said mirror is in position for projection of an image by said projector via reflection from the mirror of light emitted by said second light source in the projector, and the first light source is retracted and a second position wherein said first light source is in position for permitting contact exposure by the first light source, and the mirror is retracted.

31. Apparatus as set forth in claim 29 wherein said mirror is movable between a first position for reflection of an image from the film on to the plate at the exposure position and a second position for reflection of light from the first light source on to the plate at the exposure position.

32. Apparatus as set forth in claim 26 having means whereby images may be projected on to different areas of a plate or on to different plates at the exposure position.

33. Apparatus as set forth in claim 26 wherein said projecting means includes a film projector and means for moving the projector to different positions whereby images may be projected on to different areas of a plate or on to different plates at the exposure position.

34. Apparatus as set forth in claim 26 wherein said projecting means includes a film projector and a mirror for reflection of the image from film in the projector on to the said face of a plate at the exposure position, and having means for moving the projector to different positions whereby images may be projected on to different areas of a plate or on to different plates at the exposure position.

35. Apparatus as set forth in claim 34 having means for moving the mirror to different positions of adjustment.

* * * * *